US008531535B2

(12) United States Patent
Kwatra et al.

(10) Patent No.: US 8,531,535 B2
(45) Date of Patent: Sep. 10, 2013

(54) METHODS AND SYSTEMS FOR PROCESSING A VIDEO FOR STABILIZATION AND RETARGETING

(75) Inventors: Vivek Kwatra, Santa Clara, CA (US); Matthias Grundmann, Atlanta, GA (US)

(73) Assignee: Google Inc., Mountain View, CA (US)

( * ) Notice: Subject to any disclaimer, the term of this patent is extended or adjusted under 35 U.S.C. 154(b) by 198 days.

(21) Appl. No.: 13/023,299

(22) Filed: Feb. 8, 2011

(65) Prior Publication Data

US 2012/0105654 A1 May 3, 2012

Related U.S. Application Data

(60) Provisional application No. 61/407,630, filed on Oct. 28, 2010.

(51) Int. Cl.
*H04N 5/228* (2006.01)
*H04N 7/18* (2006.01)

(52) U.S. Cl.
USPC ..................................... 348/208.14; 348/155

(58) Field of Classification Search
USPC .................. 348/208.99, 208.12, 208.3, 143, 348/208.4, 154, 155, 208.14
See application file for complete search history.

(56) References Cited

U.S. PATENT DOCUMENTS

| | | | | |
|---|---|---|---|---|
| 7,433,497 | B2 * | 10/2008 | Chen | 382/107 |
| 7,558,405 | B2 * | 7/2009 | Tico et al. | 382/107 |
| 2007/0002146 | A1 * | 1/2007 | Tico et al. | 348/208.1 |
| 2009/0066800 | A1 | 3/2009 | Wei | |
| 2009/0251594 | A1 * | 10/2009 | Hua et al. | 348/441 |

OTHER PUBLICATIONS

International Search Report and Written Opinion issued by the U.S. Patent Office in PCT/US2011/58111, mailed Feb. 13, 2012.
Smith, Brandon et al., "Light Field Video Stabilization", IEEE International Conference on Computer Vision (ICCV), Sep. 29-Oct 2, 2009.
Gleicher, Michael et al., "RE—Cinematography: Improving the Camera Dynamics of Casual Video", ACM Multimedia 2007, Sep. 2007.
Liu, Feng et al., "Content-Preserving Warps for 3D Video Stabilization", ACM Transactions on Graphics (Proceedings of ACM SIGGRAPH 2009), vol. 28, Nov. 3, 2009.
Wikepedia, "OpenCV". Retrieved from http://en.wikipedia.org/wiki/OpenCV, printed on Feb. 8, 2011.
Wikepedia, "RANSAC". Retrieved from http://en.wikipedia.org/wiki/RANSAC, printed on Feb. 8, 2011.

* cited by examiner

*Primary Examiner* — James M Hannett
*Assistant Examiner* — Ahmed A Berhan
(74) *Attorney, Agent, or Firm* — McDonnell Boehnen Hulbert & Berghoff LLP

(57) ABSTRACT

Methods and systems for processing a video for stabilization and retargeting are described. A recorded video may be stabilized by removing shake introduced in the video, and a video may be retargeted by modifying the video to fit to a different aspect ratio. Constraints can be imposed that require a modified video to contain pixels from the original video and/or to preserve salient regions. In one example, a video may be processed to estimate an original path of a camera that recorded the video, to estimate a new camera path, and to recast the video from the original path to the new camera path. To estimate a new camera path, a virtual crop window can be designated. A difference transformation between the original and new camera path can be applied to the video using the crop window to recast the recorded video from the smooth camera path.

25 Claims, 10 Drawing Sheets

COMPUTER PROGRAM PRODUCT 1400

SIGNAL BEARING MEDIUM 1401

PROGRAM INSTRUCTIONS 1402

- ESTIMATING AN ORIGINAL MOTION PATH OF A CAMERA THAT RECORDED A VIDEO

- DETERMINING AT EACH TIME $T$ A SUBSTANTIALLY CONSTANT PATH, A SUBSTANTIALLY CONSTANT VELOCITY, OR A SUBSTANTIALLY CONSTANT ACCELERATION OF THE ORIGINAL MOTION PATH OF THE CAMERA

- DETERMINING A MODIFIED MOTION CAMERA PATH OF THE ORIGINAL MOTION PATH OF THE CAMERA INCLUDING FOR EACH TIME $T$ THE SUBSTANTIALLY CONSTANT PATH, THE SUBSTANTIALLY CONSTANT VELOCITY, OR THE SUBSTANTIALLY CONSTANT ACCELERATION OF THE ORIGINAL MOTION PATH OF THE CAMERA

- BASED ON THE MODIFIED MOTION CAMERA PATH AND THE ORIGINAL MOTION PATH OF THE CAMERA, DETERMINING A CROP WINDOW TRANSFORM THAT DESCRIBES HOW TO MODIFY THE ORIGINAL MOTION PATH OF THE CAMERA TO THE MODIFIED MOTION CAMERA PATH, THE CROP WINDOW TRANSFORM DETERMINED ACCORDING TO AT LEAST ONE CONSTRAINT LIMITING CHANGES TO THE ORIGINAL MOTION PATH OF THE CAMERA

- APPLYING THE CROP WINDOW TRANSFORM TO THE VIDEO TO RECAST THE VIDEO FROM A VIEWPOINT OF THE ORIGINAL MOTION PATH OF THE CAMERA TO A VIEWPOINT OF THE MODIFIED MOTION CAMERA PATH

| COMPUTER READABLE MEDIUM 1403 | COMPUTER RECORDABLE MEDIUM 1404 | COMMUNICATIONS MEDIUM 1405 |

FIGURE 14

METHODS AND SYSTEMS FOR PROCESSING A VIDEO FOR STABILIZATION AND RETARGETING

CROSS REFERENCE TO RELATED APPLICATION

The present application claims priority to U.S. provisional patent application Ser. No. 61/407,630, filed on Oct. 28, 2010, the entire contents of which are herein incorporated by reference as if fully set forth in this description.

BACKGROUND

Image stabilization includes many techniques used to reduce blurring associated with motion of a camera during exposure. Image stabilization techniques may compensate for pan and tilt (angular movement) of a camera or other imaging device. With still cameras, camera shake can be problematic at slow shutter speeds or with long focal length (telephoto) lenses, and image stabilization techniques can be used to improve a still picture.

Similarly, video stabilization techniques may be used to improve recorded videos. With video cameras, camera shake can cause visible frame-to-frame jitter in a recorded video. For example, handheld camera or handheld video recording is a film and video technique in which a camera is held in the camera operator's hands, and a handheld recorded video may be perceptibly shakier than a video recorded using a tripod-mounted camera (or other stabilization equipment, such as camera dollies or steady-cams) due to motion of the operator holding the camera during recording. However, recording videos using handheld video recording may enable more opportunities for filming.

Video stabilization techniques may be used to create a stable version of a casually shot video (e.g., a video recorded on a device with little or no stabilization equipment). Video stabilization techniques generally attempt to render the recorded video as the video would have been recorded from a smooth or stable camera path.

SUMMARY

The present application discloses embodiments of systems and methods for processing a video for stabilization and retargeting. In one aspect, a method for processing a video is described. The method may comprise estimating an original motion path of a camera that recorded a video. The method may also comprise determining at each time t a substantially constant path, a substantially constant velocity, or a substantially constant acceleration of the original motion path of the camera. The method also may comprise determining a modified motion camera path of the original motion path of the camera including for each time t the substantially constant path, the substantially constant velocity, or the substantially constant acceleration of the original motion path of the camera. The method may further comprise based on the modified motion camera path and the original motion path of the camera, determining a crop window transform that describes how to modify the original motion path of the camera to the modified motion camera path, and the crop window transform may be determined according to at least one constraint limiting changes to the original motion path of the camera. The method may further comprise applying the crop window transform to the video to recast the video from a viewpoint of the original motion path of the camera to a viewpoint of the modified motion camera path.

In another aspect, a non-transitory computer readable medium having stored therein instructions executable by a computing device to cause the computing device to perform functions is described. The functions may comprise estimating an original motion path of a camera that recorded a video. The function may further comprise determining at each time t a substantially constant path, a substantially constant velocity, or a substantially constant acceleration of the original motion path of the camera. The functions also may comprise determining a modified motion camera path of the original motion path of the camera including for each time t the substantially constant path, the substantially constant velocity, or the substantially constant acceleration of the original motion path of the camera. The functions further may comprise based on the modified motion camera path and the original motion path of the camera, determining a crop window transform that describes how to modify the original motion path of the camera to the modified motion camera path, the crop window transform determined according to at least one constraint limiting changes to the original motion path of the camera. The functions further may comprise applying the crop window transform to the video to recast the video from a viewpoint of the original motion path of the camera to a viewpoint of the modified motion camera path.

In still another aspect, a camera path translation system is provided that comprises a camera path estimation engine, a video stabilization and retargeting engine, and a video translation engine. The camera path estimation engine may be configured to receive a video, and to estimate an original motion path of a camera that recorded the video based on motion of objects within the video. The video stabilization and retargeting engine may be configured to determine a crop window transform that describes how to modify the original motion path of the camera to a modified motion camera path, and the crop window transform may be determined according to at least one constraint limiting changes to the original motion path of the camera. The video translation engine may be configured to apply the crop window transform to the video to recast the video from a viewpoint of the original motion path of the camera to a viewpoint of the modified motion camera path.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 14 is a schematic illustrating a conceptual partial view of an example computer program product that includes a computer program for executing a computer process on a computing device, arranged according to at least some embodiments presented herein.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

This disclosure may disclose, inter alia, systems and methods for stabilizing and retargeting recorded videos. For example, a recorded video may be stabilized by removing at least a portion of shake introduced in the video, and a video may be retargeted by modifying the video to fit to a different aspect ratio. The disclosure describes examples for stabilizing and retargeting recorded video by imposing constraints that require a modified video to contain valid pixels from the original recorded video and/or to preserve salient regions and objects, for example.

In one example, a video may be stabilized by performing post-processing techniques. The video may be processed to estimate an original path (e.g., motion) of a camera that recorded the video, to estimate a new steady/smooth camera path, and to recast the video from the original path to the smooth camera path. In one example, to estimate a new camera path, a virtual crop window of a pre-defined scale less than one with respect to an original frame size can be designated. A difference transformation between the original and smooth camera path can be applied to the recorded video using the crop window to recast the recorded video as if the video had been recorded from the smooth camera path to remove shake from the recorded video, for example. If the crop window does not fit in the original frame, in one example, undefined areas may be filled using motion-in-painting. In another example, constraints can be imposed to prevent undefined areas from occurring.

I. Example Camera Path Translation System

Figure 1:
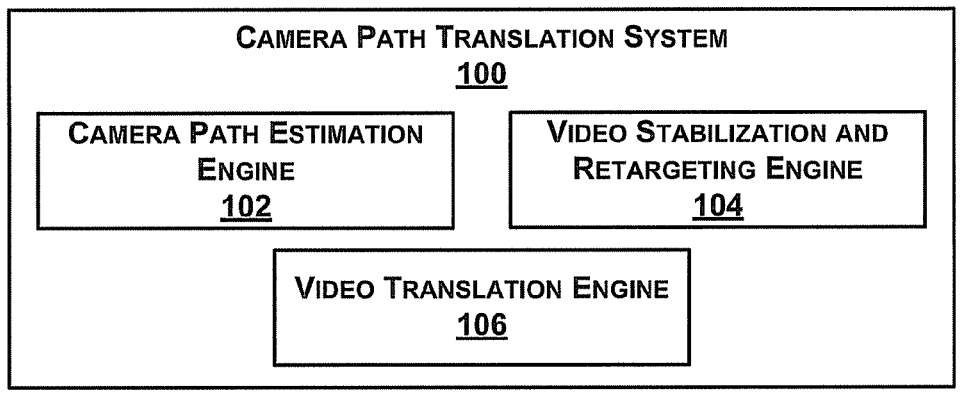
FIG. 1 illustrates a block diagram of an example camera path translation system.

Referring now to FIG. 1, a block diagram of a camera path translation system 100 is illustrated. The camera path translation system 100 includes a camera path estimation engine 102, a video stabilization and retargeting engine 104, and a video translation engine 106. The camera path translation system 100 may be configured to receive a video, and to perform video stabilization processes on the video. For example, the camera path estimation engine 102 may estimate a path of a camera that recorded the video based on motion of objects within the received video. The video stabilization and retargeting engine 104 may then estimate a new steady/smooth camera path, and the video translation engine 106 may recast the received video from a viewpoint of the smooth camera path determined by the video stabilization and retargeting engine 104.

One or more of the described functions or components of the system 100 may be divided up into additional functional or physical components, or combined into fewer functional or physical components. In some further examples, additional functional and/or physical components may be added to the examples illustrated by FIG. 1. Still further, any of the camera path estimation engine 102, the video stabilization and retargeting engine 104, and/or the video translation engine 106 may include or be provided in the form of a processor (e.g., a micro processor, a digital signal processor (DSP), etc.) configured to execute program code including one or more instructions for implementing logical functions described herein. The system 100 may further include any type of computer readable medium (non-transitory medium), for example, such as a storage device including a disk or hard drive, to store the program code. In other examples, the camera path translation system 100 may be included within other systems.

Figure 2:
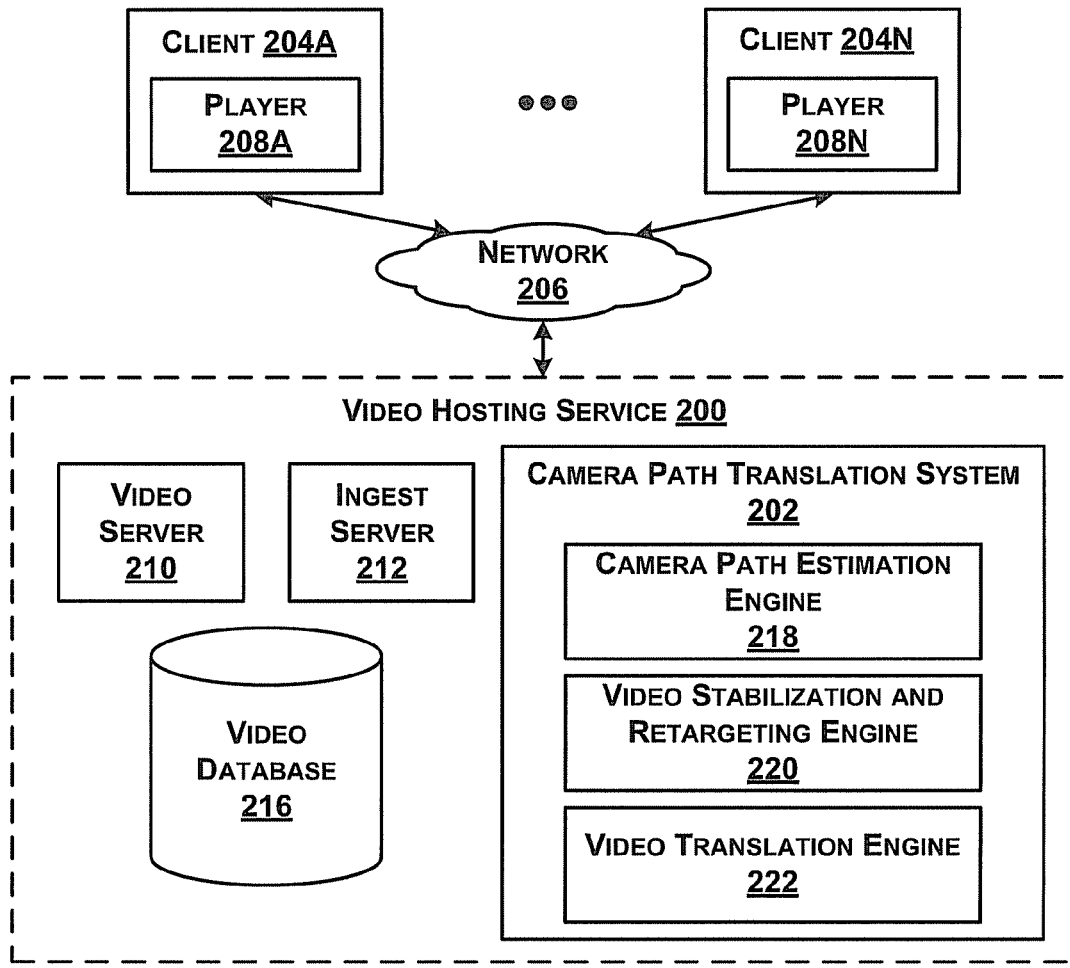
FIG. 2 is a block diagram illustrating an example system view of a video hosting service that includes a camera path translation system.

FIG. 2 is a block diagram illustrating a system view of a video hosting service 200 that includes a camera path translation system 202. Multiple users/viewers may use clients 204A-N to send video hosting requests to the video hosting service 200, such as to upload videos to a video hosting website, and to receive the requested services from the video hosting service 200. The video hosting service 200 may be configured to communicate with the one or more clients 204A-N via a network 206. The video hosting service 200 may receive the video hosting service requests from the clients 204A-N over wired or wireless connections.

Turning to the individual entities illustrated on FIG. 2, each client 204A-N may be used by a user to request video hosting services. For example, a user can use the client 204A to send a request for uploading a video for sharing, or playing a video. The clients 204A-N can be any type of computer device, such as a personal computer (e.g., desktop, notebook, tablet, laptop) computer, as well as devices such as a mobile telephone, personal digital assistant, or IP enabled video player. The clients 204A-N may include a processor, a display device (or output to a display device), and a local storage, such as a hard drive or flash memory device to which the clients 204A-N store data used by the user in performing tasks, and a network interface for coupling to the video hosting service 200 via the network 206.

The clients 204A-N may include a video player 208A-N (e.g., the Flash™ player from Adobe Systems, Inc., or a proprietary one) for playing a video stream. The video player 208A-N may be a standalone application, or a plug-in to another application such as a network or Internet browser. Where the client 204A-N is a general purpose device (e.g., a desktop computer, mobile phone), the player 208A-N may be implemented as software executed by the computer. Where the client 204A-N is a dedicated device (e.g., a dedicated video player), the player 208A-N may be implemented in hardware, or a combination of hardware and software. The player 208A-N may include user interface controls (and corresponding application programming interfaces) for selecting a video feed, starting, stopping, and rewinding a video feed. Also, the player 208A-N can include in a user interface a video display format selection configured to indicate a video display format (e.g., a standard definition TV or a high-definition TV). Other types of user interface controls (e.g., buttons, keyboard controls) can be used as well to control the playback and video format selection functionality of the player 208A-N.

The network 206 enables communications between the clients 204A-N and the video hosting service 200. In one embodiment, the network 206 is the Internet, and uses standardized internetworking communications technologies and protocols, known now or subsequently developed that enable the clients 204A-N to communicate with the video hosting service 200. In another embodiment, the network 206 may be a wireless cellular network that enables wireless communication between the clients 204A-N and the video hosting service 200.

The video hosting service 200 comprises the camera path translation system 202, a video server 210, an ingest server 212, and a video database 216. The video server 210 may be configured to serve videos from the video database 216 in response to user video hosting service requests. The ingest server 212 may be configured to receive user uploaded videos and store the videos in the video database 216. The video database 216 may be configured to store user uploaded videos and videos processed by the camera path translation system 202. In one embodiment, the video database 216 stores a large video corpus.

The camera path translation system 202 may include a camera path estimation engine 218, a video stabilization and retargeting engine 220, and a video translation engine 222. The camera path translation system 202 may be configured to receive user uploaded videos from the ingest server 212, and to perform video stabilization of the videos.

II. Video Stabilization

In one example, the camera path estimation engine 218 may estimate a path of a camera that recorded the video based on motion of objects or images within the received video. A camera path may be estimated by extracting trackable features in frames of the video, matching features, and performing local outlier rejection to remove spurious matches that may distort motion estimation. Linear motion models (e.g., translation, similarity, affine) may be fit to the tracked features to estimate a motion of the camera between two frames, and the motion models can be transformed to a common coordinate system and concatenated to yield an estimated original camera path over all frames of the video.

The video stabilization and retargeting engine 220 may then estimate a new steady/smooth camera path based on constraints. For example, a base vertical line may be established for desired vertical camera path motion, and constraints can be established to allow a camera path to be modified by a constrained amount (e.g., if camera motion moves downward, pixels in images are moved upward to align with a previous frame and bottom row(s) of pixels can be removed or cropped out to an extent as allowed by the constraints).

A smooth camera path can be estimated using minimization of derivatives of the original camera path as estimated by the camera path estimation engine 218. For example, a constant path may represent a static camera, i.e. $\frac{dP}{dt} = 0$ (where $P$ is a function representing the camera path), a path of constant velocity may represent a panning or a dolly shot, i.e. $\frac{d^2 P}{dt^2} = 0$, and a path of constant acceleration may represent ease-in and out transitions between static and panning cameras, $$\frac{d^3 P}{dt^3} = 0.$$

The estimated smooth camera path may be segments of constant, linear, or parabolic motion. The segments may be static segments rather than a superposition of the segments to avoid residual motion.

In one example, to estimate a camera path P(t) comprising segments of constant, linear, and parabolic motion, an optimization may be performed as a constrained L1 minimization solution. For example, an N-dimensional vector norm of order p is defined as $$|x|_p = \left( \sum_{i=1}^{N} |x_i|^p \right)^{\frac{1}{p}},$$

which is a sum of the pth power of the absolute value of its components followed by the pth root of the result. An L1/L2 norm calculation may be performed using this standard. L1 minimization may result in a path with derivatives (described above) being zero for many segments. An L1 camera path may comprise segments resembling a static camera, linear motion, and constant acceleration. In another embodiment, L2 minimization may be used to minimize the above derivatives on average to result in small, but possibly non-zero gradients (e.g., which may result in an L2 camera path that has some small non-zero motion).

In addition, a camera path P(t) can be determined that minimizes the above derivatives while satisfying constraints. A variety of constraints may be used such as an inclusion, proximity, and saliency constraints. An inclusion constraint requires a crop window transformed by the path P(t) to always or substantially always be contained in an original frame rectangle transformed by C(t), the camera path. A proximity constraint includes a new camera path P(t) preserving (or substantially preserve) the original intent of the movie, e.g., if the original path contained segments of zooming, the new camera path may follow this motion. A saliency constraint includes salient points (e.g., obtained by a face detector or general mode finding in a saliency map) within all or a part of a crop window transformed by P(t). Many other constraints may be used as well.

The video translation engine 222 may recast the received video from a viewpoint of the smooth camera path determined by the video stabilization and retargeting engine 220 by applying a transformation to the video to produce a cropped video with less shake, for example. Thus, in one embodiment, video stabilization may be performed by (1)

estimating per-frame motion transforms $F_t$, (2) determining an optimal camera path $P_t=C_tB_t$ (where $C_t$ is based on the motion transforms $F_t$ and $B_t$ is a crop window transform estimated as described below) and (3) stabilizing the video by warping according to $B_t$.

Figure 3:
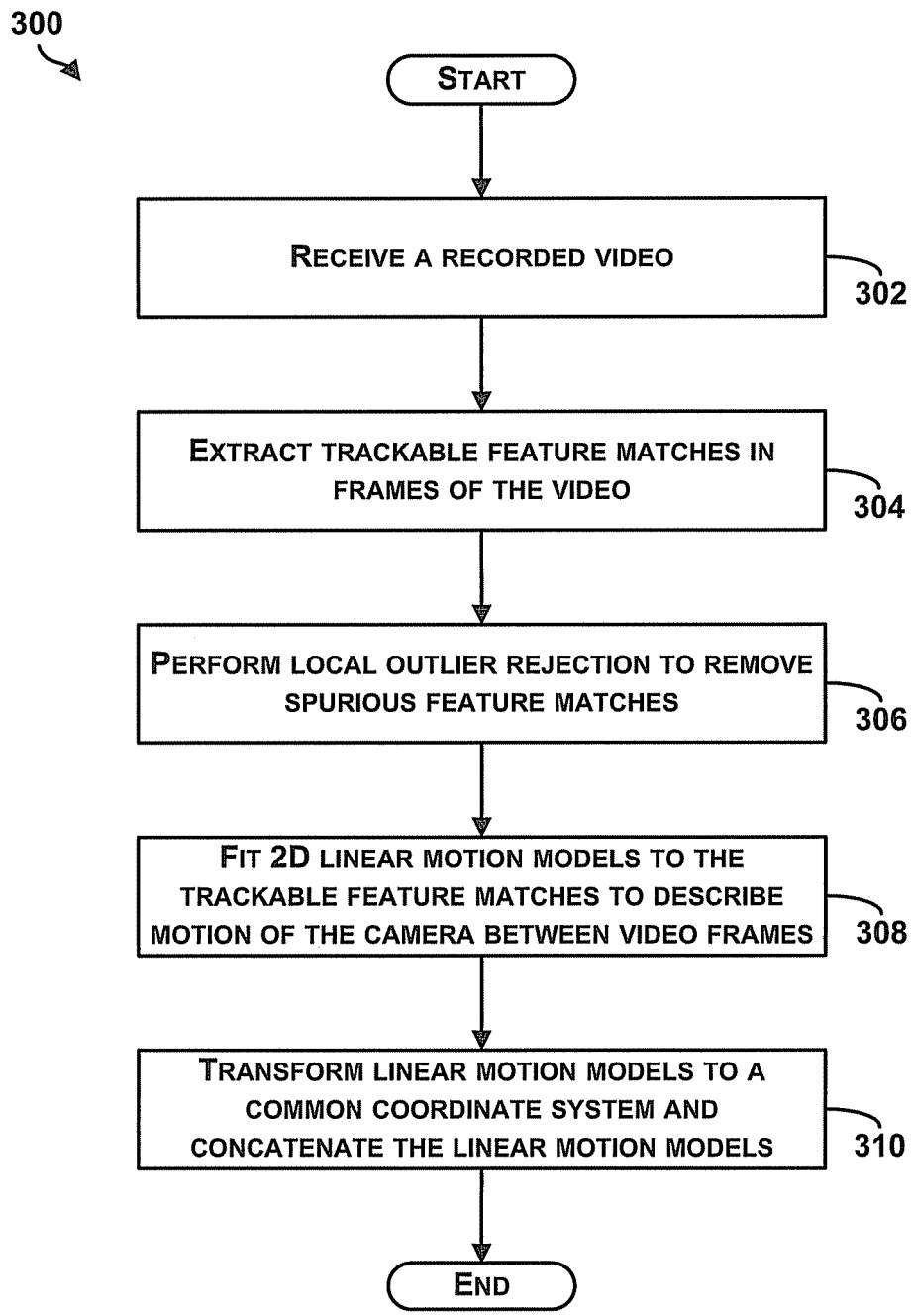
FIG. 3 is an example block diagram of a method to process a video to estimate an original motion of the camera or camera path, in accordance with at least some embodiments described herein.

FIG. 3 is an example block diagram of a method to process a video to estimate an original motion of the camera or camera path, in accordance with at least some embodiments described herein. Method 300 shown in FIG. 3 presents an embodiment of a method that, for example, could be used with the systems 100 and 200, for example, and may be performed by a device, a server, or a combination of the device and the server. Method 300 may include one or more operations, functions, or actions as illustrated by one or more of blocks 302, 304, 306, 308, and 310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, a recorded video is received. At block 304, trackable feature matches in frames of the video are extracted. For example, trackable features in each frame of the video are extracted, or trackable features in substantially all frames of the video are extracted. Trackable features in frames of the video may be extracted using feature tracking software, such as the pyramidal Lucas-Kanade feature tracking as implemented in OpenCV. Features may be tracked from frame to frame using any number of methods. Example features for extracting include corners of an image in which intensity changes along the x and y dimension of an image. In another example, trackable features between two frames may be extracted by extracting a number of features in a first video frame (e.g., based on x and y location) and tracking the extracted features in a next video frame. For example, if the video is a sequence of images, $I_1, I_2, \ldots I_n$, video frame pairs may be $(I_{t-1}, I_t)$, and feature pairs between video frames may be extracted (e.g., for each feature x in frame $I_{t-1}$, a corresponding feature y at the same point in space as the feature x is found in frame $I_t$). With small intra-frame motions and changes in illumination, brightness values of a small image patch (e.g., 7×7 pixels) centered around the feature point x in $I_{t-1}$ and its matching point y in $I_t$ may be nearly identical. For each feature x in $I_{t-1}$, a displacement vector d may be determined such that the $I_{t-1}(x)=I_t(x+d)$, and therefore $x+d=y$ using the previous notation (e.g., that is feature matches (x<->y)). This expression can be linearized by Taylor Series expansion around x, yielding $DI_t(x)*d=I_{t-1}(x)-I_t(x)$ which is linear in the unknown displacement vector d. An over determined linear system of equations may be determined of the form $A*d=b$ that can be then solved by using normal equations (i.e., solving the symmetric linear system $A^TA\ d=A^Tb$ by Gaussian Elimination, where $A^T$ denotes the transpose of A). This process may be referred to as pyramidical Lucas-Kanade Tracking.

During feature tracking from one frame to the next frame, errors may accumulate. To detect potentially poor feature matches, images in a window around the feature in the current frame can be monitored to determine if the images are similar to the images around the feature in the first frame. Features may be tracked over many frames, and the image content can change. For a consistency verification, translational mapping that is used for feature tracking from frame to frame may be performed, in addition to a similarity or an affine mapping.

This process may be performed for all video frames of the video to determine multiple pairs of feature correspondences, i.e., each pair corresponding to a feature location in a first and a second frame, respectively.

At block 306, local outlier rejection may performed to remove spurious extracted feature matches or feature-pairs that may distort motion estimation (rather than or in addition to global outlier rejection to account for multiple independent motion layers). Some of the feature-pair matches between video frames may be incorrect and can be removed. To remove feature-pairs matches that may have been incorrectly identified as a corresponding pairs, an algorithm, such as random sample consensus (RANSAC), may be used. The algorithm may identify outliers within a set of observed data. For example, all feature-pairs may be initialized as inliers, i.e., data whose distribution can be explained by a set of model parameters. An average mathematical translation (e.g., moving every point a constant distance in a specified direction) can be computed based on inlier pairs. Pairs whose translation differs from the average translation by more than a threshold amount can be removed from the inlier set and classified as "outliers" that are data that do not fit the model. The threshold amount may be determined based on observed results. A smaller threshold can be used to remove a larger number of feature-pairs, and a larger threshold can be used to remove a smaller number of feature-pairs. The algorithm may be performed iteratively (e.g., with a fixed number of iterations) by determining an average mathematical translation of feature-pairs that were not removed from the inlier set.

In another example, to perform local outlier rejection to remove spurious feature matches, a model may be fit to the feature-pairs. The model may be formed by a mathematical translation or other linear transformations as well. If a feature-pair fits the model, the feature-pair is considered an inlier. The model may be reasonably sufficient if a number of points have been classified as inliers. The model can be reestimated from all feature-pairs that are now considered inliers. This procedure can be repeated a fixed number of times, and each time may produce either a model which is rejected because too few points are classified as inliers or a refined model together with a corresponding error measure.

To account for independent moving objects, the local outlier rejection can be performed by leveraging per-frame segmentation and imposing a local 2D translation motion model on each region for each feature-pair. To reduce overhead introduced by using per-frame segmentation, an estimation-mode may be used that replaces segmentation regions with square regions of similar block sizes onto each frame, for example.

In addition, feature-pairs can be removed from moving objects in a foreground region. For example, local-outlier rejected feature-pairs can be classified into independent moving foreground and static background regions by estimating a fundamental Matrix (F) using RANSAC from the feature-pairs, where the fundamental matrix F is a 3×3 matrix that relates corresponding points in stereo images (e.g., with homogeneous image coordinates, x and x', of corresponding points in a stereo image pair, Fx describes a line (an epipolar line) on which the corresponding point x' on the other image lies). Regions that adhere to the fundamental matrix constraint can be labeled background regions, and regions that violate the constraint can be labeled foreground regions.

In still another example, to perform local outlier rejection to remove spurious feature matches, features may be discretized into a grid of 50×50 pixels and RANSAC may be performed on each grid cell to estimate a translational model in which matches that agree within a specific threshold distance (e.g., <2 pixels) with an estimated model may be retained.

In still another example, to perform local outlier rejection, neighboring features may be required to have similar displacement vectors. This can be achieved by partitioning an image into regions (e.g., using grid based regions or perceptually homogeneous regions obtained from image segmentation). For each region R, a random displacement vector d is selected that falls into this region, and a number of displacement vectors in R that are within a specified distance (e.g., 2 pixels) to the selected vector d can be determined (referred to as "inliers"). This process can be repeated several times and a largest inlier set. This process can be applied to each region, for example.

At block 308, two-dimensional (2D) linear motion models (e.g., translation, similarity, affine) can be fit to the trackable feature-matches to describe motion of the camera between video frames or between two consecutive video frames. For example, the video may be a sequence of images $I_1, I_2, \ldots I_n$, and each frame-pair $(I_{t-1}, I_t)$ can be associated with a linear motion model $F_t(x)$ modeling the motion of feature points x from $I_t$ to $I_{t-1}$. A least square fit can be determined for a linear transform that maps feature matches from one frame to the next (e.g., to describe motion of pixels between frames—such as feature moved 10 pixels to the right, equivalent to movement of the camera to the left by 10 pixels). For a mathematical translation, the least square fit can be an average of translations for each feature pair match.

As one example, an estimate of the original camera path (C(t)) can be determined by fitting linear motion models to the tracked feature pair matches resulting in a linear transform for each feature pair (e.g., a linear transform describing motion of the feature of the matched feature-pair from one video frame to the next video frame). Features in a first frame may be denoted as $\{x_1, \ldots, x_n\}$ and corresponding features in a second frame may be denoted as $\{x'_1, \ldots, x'_n\}$. A linear transform F can be found such that $$C_{t+1} = C_t F_{t+1} \qquad \text{Equation (1)}$$

The linear transform F may be the function minimizing $$\min_p \sum_{i=1}^{n} \|F(x_i; p) - x'_i\|^2 \qquad \text{Equation (2)}$$

where p represents an actual degrees of freedom of the linear motion model and may be different for translation, similarity, and affine. If F is linear and satisfies the parameterization for p=0 yields F=0, a Taylor expansion for p around zero gives:

$$F(x_i; p) = F(x_i; 0) + \frac{d}{dp}F(x_i; 0) * p = \frac{d}{dp}F(x_i, 0) * p \qquad \text{Equation (3)}$$

The result of F(x, p) applied to $x_i$ can be expressed as a matrix multiplication of the Jacobian of F with respect to p evaluated at $x_i$ times the parameter vector p. Thus, defining $$\frac{d}{dp}F(x_i; 0) = J(x_i),$$

the minimization in Equation (2) may be expressed as:

$$\min_p \sum_i = \|J(x_i) * p - x'_i\|^2 \qquad \text{Equation (4)}$$

Feature points may be scaled by an inverse of a diameter of a frame-size. A resulting transform between two frames can be expressed as $$\frac{1}{S}FS.$$

In one example, S may improve a quality (or condition) of the result. In general, feature point locations are used in the matrix J, and it is desired to have the matrix elements in J somewhat similar, (e.g., between −1 and 1). Using the pre-conditioning transform S, solving the linear system becomes more unstable.

Equation (4) can be solved for a number of linear motion models for each of the video frames of the video (or for any number of the video frames of the video). Many linear motion models may be used, such as a translation model $\{F(x; t)=x+t\}$, a similarity model $\{F(x; t, a, b)=[a-b; b\ a]*x+t\}$, and an affine model $\{F(x; t, a, b, c, d)=[a\ b;\ c\ d]*x+t\}$. In one example, Equation (4) may be written in matrix from as $$\begin{bmatrix} J(x_1) \\ J(x_2) \\ \ldots \\ J(x_n) \end{bmatrix} p = \begin{bmatrix} x'_1 \\ x'_2 \\ \ldots \\ x'_n \end{bmatrix},$$

or A p=b. This is an over-determined system (more rows than columns) and can be solved using a least-squares method. One example approach to solve the equation is to use a normal equation form, i.e., A^T A p=A^T b, where (^T) denotes a transpose of a matrix. This results in a k×k linear system (here k is a number of degrees of freedom in p) and can be solved using a Gaussian elimination process, for example.

Additional methods for determining two-dimensional (2D) linear motion models (e.g., translation, similarity, affine) for the trackable feature-matches are also possible. For example, a parametric motion model can be fit to the locally outlier rejected feature matches, i.e. a motion that can be described by a set of parameters or degrees of freedom (DOF) such as a translation (2 DOF), similarity (2 DOF translation, 1 DOF scale, 1 DOF rotation), affine (6 DOF) or a homography (8 DOF). A linear model can be expressed as matrix multiplication with a location x, i.e., y=A[p]*x, with A being a matrix and p the parameterization. For example, for a similarity, p=[dx, dy, s (scale), r (cos of rotation)] and A[p] would be the 3×3 matrix $$\begin{bmatrix} s & -r & dx \\ r & s & dy \\ 0 & 0 & 1 \end{bmatrix}.$$

A residual r=y−A[p]*x can be minimized with respect to the motion parameters p or respectively DOF that compose A. This may be performed by linearizing the residual via Taylor Series expansion around p, yielding r=y−D A[0; x]*p−x, where D A[0; x]:=J(x) is the derivative or Jacobian of the matrix A with respect to p, evaluated at p=0 and x. Thus, r=y−x−J(x)*p. The parameterization p can be determined such that the residual is minimized, and this may be performed by stacking all residuals onto each other yielding one over-determined system of the form Ap=b, which can be solved via normal equations $A^T$*A p=$A^T$ b (or A'p=b'). To suppress outliers due to foreground motion, an iterative reweighted least-square (IRLS) method may be used by multiplying each row of A' and b' by the inverse of the absolute value of the corresponding residual r, and a solution of the residual can be determined for about 20 times, for example. Note that r is a two dimensional vector and the minimization via normal equations can be performed in the squared L2 norm of r, i.e., $|r|_{\{L2\}}=r_x*r_x+r_y*r_y$. Such minimization may estimate a motion model that is a mixture of background and foreground motion), in contrast to a motion model for the background motion. In another example, minimization of the L1 norm can be performed (i.e., $|r|_{\{L1\}}=|r_x|+|r_y|$ that is the sum of absolute value of its components). Instead of solving for p, such that $|Ap-b|_{\{L2\}}$=min, the following may be solved $|Ap-b|_{\{L2\}}$=min. While A and b can be computed as above, normal equations and gaussian elimination can be used to determine p. The minimization can be written as −e<A*p−b<e, where e is a vector with the requirement that each component of e>0. Then, the L1 norm of e can be minimized, e.g., $1^T e$ (here 1 is a vector of the same dimension as e having all 1's) subject to −e<A*p−b<e.

In one example, unreliable motion models may be detected by requiring at least a certain number of feature matches per frame-pair (e.g., N=30), otherwise the frame may be flagged as unreliable). In another example, estimates from lower to higher dimension motion models (e.g., similarity→homography) may be performed using matches for the higher dimension model that agree with the lower dimension within a threshold (e.g., 4 pixels) to detect unreliable motion models. In still another example, if a highest dimension motion model is deemed unreliable (e.g., too much rotation, scale or perspective) other computed models may be flagged as unreliable. A heuristic may be used that labels each frame's motion model as reliable or unreliable. Unreliable motion models can be discarded and set to identity. Additional hard constraints can be added to the optimal L1 camera path estimation to force the path to be stationary in the vicinity of unreliable frame motion models, for example. In those instances, the optimized camera path is identical with the original shaky path in these segments. In these instances, if parts of video data are too corrupted that reliable motion estimation is not possible (or is not determined), the original shaky video data can be used for this portion of the video, for example.

At block 310, the linear motion models (F) for each feature-pair are transformed to a common coordinate system and are concatenated to yield an estimate of the original camera path. For example, concatenation of all linear motion models for each feature-pair may describe motion between each of the frames of the video resulting in an estimate of the original camera path. A camera path is a cumulative path, and thus, if a camera path moved to the left by 10 pixels between two successive frames, and so on, by the time a fifth frame is reached, the camera may have moved 50 total pixels in distance, for example.

An inverse of the transform (F) between feature-pairs of video frames $I_t$ and $I_{t+1}$, $G_t = F_t^{-1}$, can be used as a coordinate transform. Note that the transform $G_t$ can be computed with respect to the coordinate system defined by frame $I_t$. Therefore, to transform each $G_t$ to a common coordinate system to be able to concatenate all linear motion models, a coordinate system can be arbitrarily chosen, such as the coordinate system of $G_t$, for example.

An estimate of the original camera path can then be obtained by concatenating the frame-pair transforms $G_1$, $G_2$, . . . , $G_{m-1}$, where m denotes the number of frames. The camera path $C=(C_1, \ldots, C_n)$ can be iteratively estimated as:

$C_1 = G_1$ and $$C_n = C_{n-1}^{-1}(C_{n-1}*G_{n-1})C_{n-1} = C_{n-1}*G_{n-1} \qquad \text{Equation (5)}$$

An estimation of per-frame linear motion models can lead to an accumulation of error over time, and thus, each frame can be tracked with respect to a previous N frames, where N is fixed (e.g., N may be about 3 to about 5 for a speed vs. accuracy trade-off). In another example, all parameters can be estimated for all frames jointly.

Thus, C(t) is an estimate of the original camera path and is described by a parametric linear motion model at each instance of time. For example, the video may be a sequence of images $I_1$, $I_2$, . . . $I_n$, and each frame-pair $(I_{t-1}, I_t)$ may be associated with a linear motion model $F_t(x)$ modeling the motion of feature points x from $I_t$ to $I_{t-1}$.

Using the method 300 in FIG. 3, an estimate of the original motion of the camera or original camera path for the video recording can be made. Following, an estimate of a new steady or smooth camera path can be determined. The steady or smooth camera path may dampen high-frequency jitter and remove low-frequency distortions that occur during handheld panning shots or videos recorded by a person walking.

Figure 4:
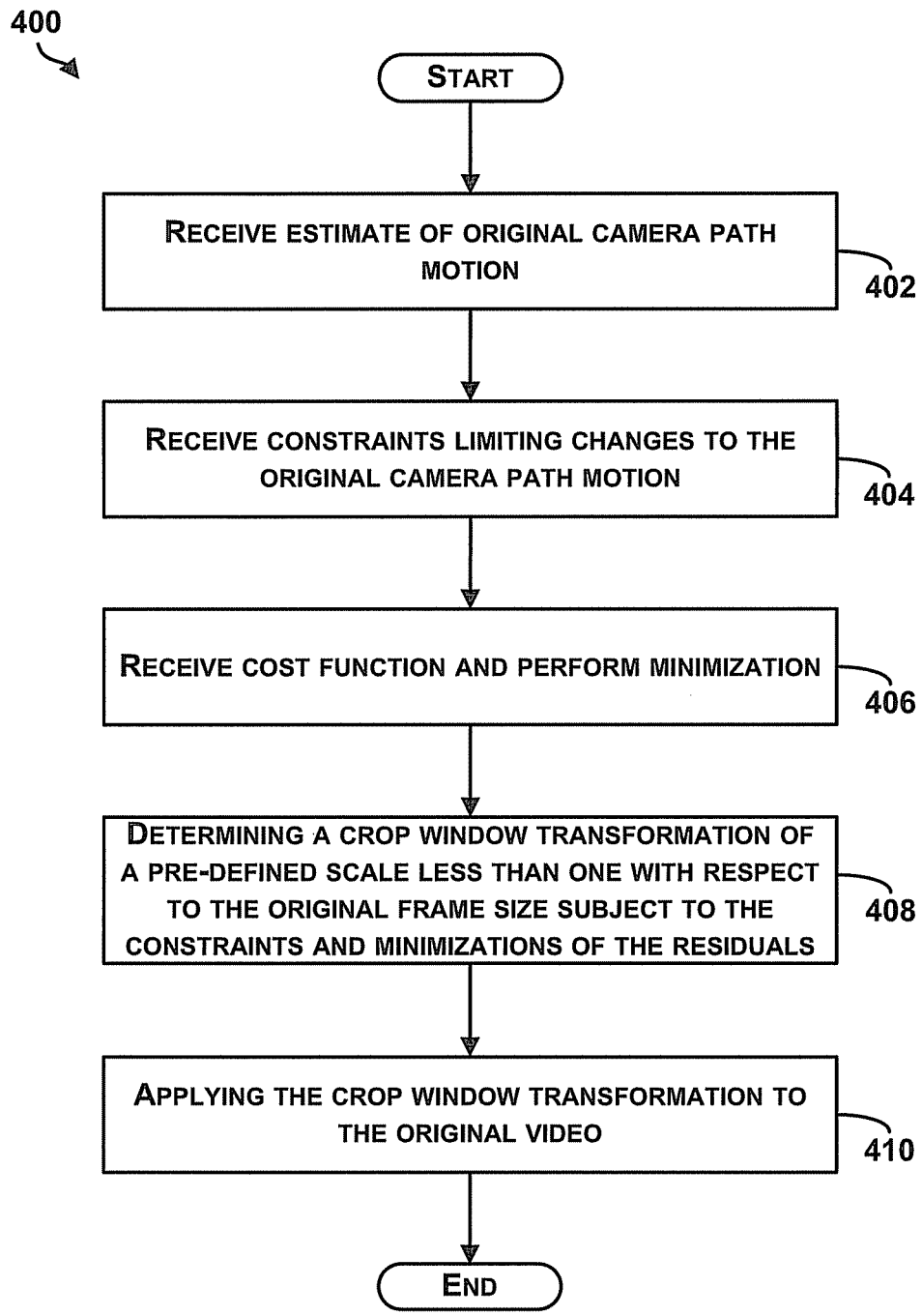
FIG. 4 is an example block diagram of a method to process a video to estimate an updated or modified motion of the camera or camera path, in accordance with at least some embodiments described herein.

FIG. 4 is an example block diagram of a method to process a video to estimate an updated or modified motion of the camera or camera path, in accordance with at least some embodiments described herein. Method 400 shown in FIG. 4 presents an embodiment of a method that, for example, could be used with the systems 100 and 200, for example, and may be performed by a device, a server, or a combination of the device and the server. Method 400 may include one or more operations, functions, or actions as illustrated by one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 402, an estimate of the original camera path motion is received. At block 404, constraints limiting changes to the original camera path motion are received. Example constraints include an inclusion constraint that requires a frame in the smooth motion to always be contained in a frame of the original camera path motion, a proximity constraint that requires the smooth camera path motion to preserve an original intent of the recorded video (e.g., if the original camera path motion contained segments of zooming, the smooth camera path motion may also contain zooming), and a saliency constraint that requires salient points (e.g., obtained by a face detector or general mode finding in a saliency map) may be included within all or a portion of a new frame in the smooth camera path motion. As another example, the constraints may indicate that the updated camera path motion results in a video frame window that fits inside a video frame window of the original camera path motion at all times.

At block 406, a cost function is received and minimization is performed. For example, the smooth or optimal camera path (P) can be partitioned into three segments, where only one may be present at each time t: a constant path, representing a static camera, i.e., $$\frac{dP}{dt} = 0,$$

a path of constant velocity, representing a panning or a dolly shot, i.e., $$\frac{d^2 P}{dt^2} = 0,$$

and a path of constant acceleration, representing an ease-in and out transition between static and panning cameras, i.e., $$\frac{d^3 P}{dt^3} = 0.$$

A connection of two different segments may have perceptively infinite acceleration, which may be noticeable as a sudden jerk in a video, and thus, a path of constant acceleration may be used. Given a continuous original camera path motion C(t), for example as found above using Equation (5), a desired smooth path P(t) can be expressed as:

$$P(t) = C(t) * B(t) \qquad \text{Equation (6)}$$

where $B(t) = C(t)^{-1} P(t)$ can be described as the camera stabilization transform or crop transform that can be applied to each video frame of the recorded video to obtain a final stabilized video (e.g., a crop window is applied to each video frame to remove all content outside the crop window). A steady or smooth camera path motion can be estimated by performing an L1 optimization with imposed constraints to assure to validity of the video content using the known C(t) from Equation (5). The optimization may determine a stable camera path P(t) by minimizing the cost function:

$$a \left| \frac{dP}{dt} \right| + b \left| \frac{d^2 P}{dt^2} \right| + c \left| \frac{d^3 P}{dt} \right| \qquad \text{Equation (7)}$$

with linear weights a, b and c, such that a video frame transformed by B(t) is contained within the constraints for all t. Equation (7) can be minimized by setting each derivative equal to zero and solved, for example. Thus, the derivatives can be defined at different points along the camera path (e.g., per frame), and a derivative can be determined at every point (every frame).

In one embodiment, weights of the cost function in Equation (7) can be preset. Alternatively, values of the weights may be determined from professional footage. For example, professional videos have different kinds of camera motions, and if jitter is added to the motion, the video stabilization algorithm may be performed to retrieve an original smooth camera path. Weights that result in a close match to the original path can be determined.

Figure 5A:
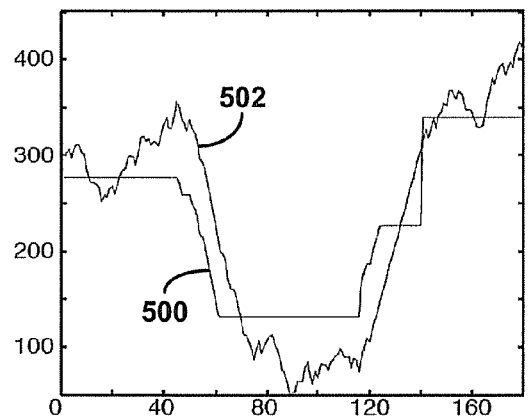
FIGS. 5A-5D illustrate example graphs of an optimal camera path determined based on a synthetic camera path.
Figure 5B:
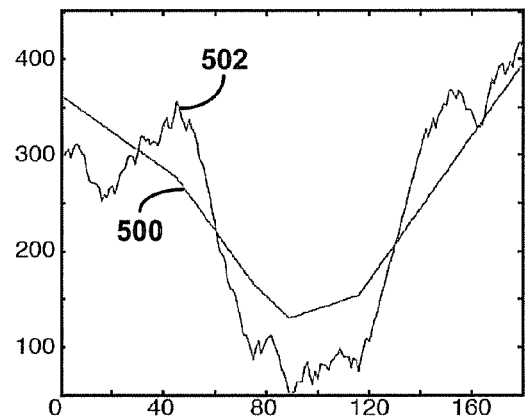
Figure 5C:
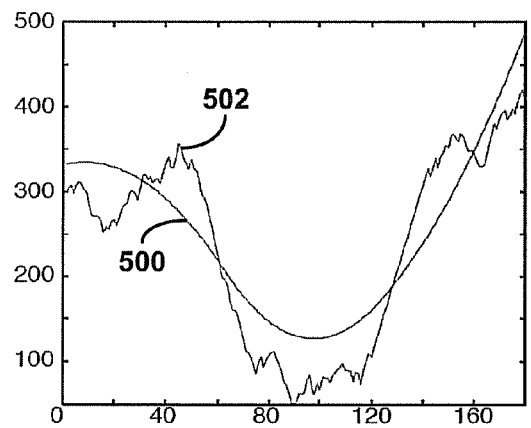

As another example, to determine weights for the cost function in Equation (7), if only one of the three derivative constraints is minimized, the original path can be approximated by either constant non-continuous paths, linear paths with jerks, or smooth parabolas with non-zero motion. FIGS. 5A-5D illustrate example graphs of an optimal camera path 500 determined based on a synthetic original camera path 502. FIG. 5A illustrates the optimal camera path 500 including constant non-continuous paths with weights chosen such that a=1, and b=c=0. FIG. 5B illustrates the optimal camera path 500 including linear paths with abrupt changes with weights chosen such that a=c=0 and b=1. FIG. 5C illustrates the optimal camera path 500 including smooth parabolas and non-zero motion using weights chosen such that a=b=0 and c=1.

Figure 5D:
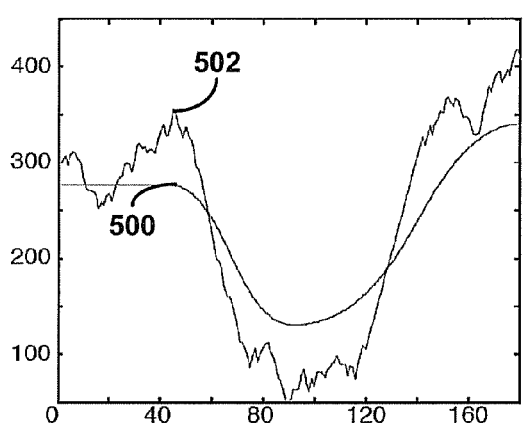

In one embodiment, all three objectives in Equation (7) can be minimized simultaneously. Twitching motions may be noticeable in stabilized video and can be minimized when weight c is chosen to be an order of magnitude larger than a maximum of weights a and b. For example, FIG. 5D illustrates the optimal camera path 500 with weights chosen such that a=10, b=1, and c=100. Further, a choice of the underlying linear motion model has an effect on the stabilized video. Using affine transforms instead of similarities, for example, has a benefit of two added degrees of freedom, but may introduce errors in skew that lead to effects of non-rigidity. However, similarities (like affine transformation) may not be able to model a non-linear inter-frame motion or rolling shutter effects, which may result in noticeable residual wobble.

To minimize $$\frac{dP}{dt} = 0,$$

using forward differencing and Equation (6) above:

$$\frac{dP}{dt} = |P_{t+1} - P_t| = |C_{t+1} B_{t+1} - C_t B_t|.$$

Applying decomposition of $C_t$ in Equation (1) results in:

$$\frac{dP}{dt} = |C_t F_{t+1} B_{t+1} - C_t B_t| \leq |C_t||F_{t+1} B_{t+1} - B_t|. \quad \text{Equation (8)}$$

With $C_t$ known from Equation (5) above, a residual of Equation (8) can be minimized over $B_t$. The residual, $|R_t|$, can be defined as:

$$R_t := F_{t+1} B_{t+1} - B_t \quad \text{Equation (9)}$$

Similarly, to minimize $$\frac{d^2 P}{dt^2} = 0,$$

using forward differencing $$\frac{d^2 P}{dt^2} = \left| \frac{d}{dt} P_{t+2} - \frac{d}{dt} P_{t+1} \right| = |P_{t+2} - 2P_{t+1} + P_t|.$$

A resulting residual can be determined, and because error may be additive, a difference of the residuals $(R_{t+1} - R_t)$ may be minimized as shown below in Equation (10):

$$|R_{t+1} - R_t| = |F_{t+2} B_{t+2} - (I + F_{t+1}) B_{t+1} + B_t| \quad \text{Equation (10)}$$

Similarly, minimizing $$\frac{d^3 P}{dt^3} = 0,$$

results in a residual of:

$$|R_{t+2} - 2R_{t+1} + R_t| = |F_{t+3} B_{t+3} - (I + 2F_{t+2}) B_{t+2} + (2I + F_{t+1}) B_{t+1} - B_t| \quad \text{Equation (11)}$$

The known frame-pair transforms $F_t$ are represented by linear motion models. For example, $F_t$ can be given as six degrees of freedom (DOF) affine transformation $$F_t = A(x; p_t) = \begin{pmatrix} a_t & b_t \\ c_t & d_t \end{pmatrix} \begin{pmatrix} x_1 \\ x_2 \end{pmatrix} + \begin{pmatrix} dx_t \\ dy_t \end{pmatrix} \quad \text{Equation (12)}$$

with $p_t$ being a parameterization vector $p_t = (dx_t, dy_t, a_t, b_t, c_t, d_t)^T$. Similarly, a four DOF linear similarity can be obtained by setting $a_t = d_t$ and $b_t = -c_t$. A weighted L1 norm of the residuals in Equations (9)-(11) can be minimized over all update transforms $B_t$ parameterized by a corresponding vector $p_t$. In this example, a residual for a constant path segment in Equation (9) may become:

$$|R_t(p)| = |M(F_{t+1}) p_{t+1} - p_t| \quad \text{Equation (13)}$$

where $M(F_{t+1})$ is a linear operation representing a matrix multiplication of $F_{t+1} B_{t+1}$ in parameter form. The residuals in Equations (9)-(11) can be solved using linear programming. For example, minimizing the L1 norm of the residuals in Equations (9)-(11) in parametric form can be performed using slack variables. Each residual may use N slack variables, where N is a dimension of the underlying parameterization, e.g., N=6 in the affine case. For n frames, this corresponds to the introduction of about 3 nN slack variables, for example. Specifically, with e being a vector of N positive slack variables, each residual can be bound from below and above as shown in Equation (14):

$$-e \leq M(F_{t+1}) p_{t+1} - p_t \leq e \quad \text{Equation (14)}$$

with $e \geq 0$. An objective may be to minimize $c^T e$ which corresponds to a minimization of the L1 norm if c=1. By adjusting weights of c, the minimization can be steered toward specific parameters, e.g., the strictly affine portion can be weighted higher than any translational portion. This may be useful since translation and affine have different scales, and therefore, a weighting of 100:1 for affine to translational portions may be used, for example.

Using linear programming, constraints can be imposed on the optimal camera path so that Equation (7) is minimized subject to constraints. Recall, that $p_t$ represents the parameterization of the crop window transform B(t), which is the transform of the crop window centered in the frame rectangle. The crop window transform B(t) can be constrained so as to limit how much B(t) can deviate from the original camera path motion to preserve an intent of the original video. Therefore, strict bounds can be placed on the affine portion of the parameterization $p_t$, which according to one example of Equation (14) may include:

$$(1) 0.9 \leq a_t, d_t \leq 1.1$$

$$(2) -0.1 \leq b_t, c_t \leq 0.1$$

$$(3) -0.05 \leq b_t + c_t \leq 0.05$$

$$(4) -0.1 \leq a_t - d_t \leq 0.1 \quad \text{Equation (15)}$$

The first two constraints in Equation (15) limit a range of change in zoom and rotation, and the latter two constraints in Equation (15) give the affine transform rigidity by limiting an amount of skew and non-uniform scale. Therefore, for each $p_t$ (e.g., affine, translation, etc.), there is an upper bound (ub) and lower bound (lb) that can be written as lowerbound $\leq U p_t \leq$ upperbound for suitable linear combinations specified by U (e.g., U is a notation placeholder, which in the example in Equation (15), lowerbound would be the vector [0.9, 0.9, −0.1, −0.1, −0.05, −0.1] and U is a matrix $$\begin{bmatrix} 0 & 0 & 1 & 0 & 0 & 0 \\ 0 & 0 & 0 & 0 & 0 & 1 \\ 0 & 0 & 0 & 1 & 0 & 0 \\ 0 & 0 & 0 & 0 & 1 & 0 \\ 0 & 0 & 0 & 1 & 1 & 0 \\ 0 & 0 & 1 & 0 & 0 & -1 \end{bmatrix}).$$

In one example, the upper bound and lower bound for the translation parameterization may be as shown below in Equation (16):

$$e_1 \geq 0 \quad \text{Equation (16)}$$
$$e_2 \geq 0$$
$$-e_1 \leq x_1 \leq e_1$$
$$-e_2 \leq x_2 \leq e_2$$

Figure 6:
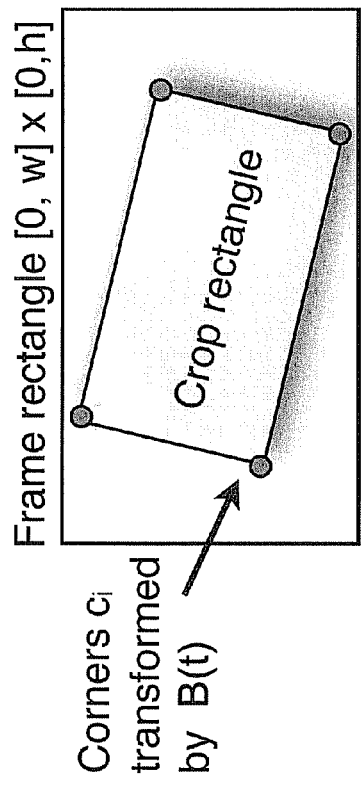
FIG. 6 illustrates an example video frame rectangle and a crop window rectangle.

As another example, to achieve the inclusion constraint, all four corners $c_i = (c_i^x, c_i^y)$, i=1, ..., 4 of the crop window transformed by the crop window transformation B(t) can be required to reside inside the original frame rectangle. FIG. 6 illustrates an example video frame rectangle and a crop window rectangle. As shown in FIG. 6, all four corners of the crop rectangle transformed by B(t) are within the original frame rectangle of coordinates [0,w] by [0,h].

Additional constraints may be imposed for smoothness constraints on similarity and affine linear motion model transformations. For example, in a similarity transform, a combination of scale, rotation and translation can be used. A smoothness constraint can be imposed on P(t) using weights a and b for the similarity transformation [F(x; t, a, b)=[a−b; b a]*x+t]. While t corresponds to translation, scale and rotation are related to a,b as:

$$\text{Scale: } s = \sqrt{(a^2+b^2)} \quad \text{Equation (17)}$$

$$\text{Rotation angle: } \theta = a\tan(b/a) \quad \text{Equation (18)}$$

While constraining smoothness on a,b, rotation and scale may not remain smooth. Since imposing smoothness constraints on s and theta may be non-linear, the estimated camera path can be used to ensure that s and theta do not deviate too much. For example, constraints on scale and rotation may be as follows:

$$\text{scale\_low} < s^2 = a^2+b^2 < \text{scale\_hi} \quad \text{Equation (19)}$$

To linearize Equation (19), $a_t$ and $b_t$ from the estimated camera transform C(t) are used to get:

$$\text{scale\_low} < a^*a_0 + b^*b_0 < \text{scale\_hi} \quad \text{Equation (20)}$$

The low and hi bounds can be calculated as:

$$\text{scale\_low} = \frac{(a_0^2 + b_0^2)}{k} \quad \text{Equation (21)}$$

$$\text{scale\_hi} = (a_0^2 + b_0^2) * k \quad \text{Equation (22)}$$

where k≈1.05. For rotation, a=s*cos(θ), b=s*sin(θ), and sin(θ) and cos(θ) can be constrained to be bounded near the estimated camera rotation as follows:

$$\cos\left(\frac{a_0}{s_0} - \varepsilon_1\right) < a < \cos\left(\frac{a_0}{s_0} + \varepsilon_1\right) \quad \text{Equation (23)}$$

$$\sin\left(\frac{b_0}{s_0} - \varepsilon_2\right) < b < \sin\left(\frac{b_0}{s_0} + \varepsilon_2\right) \quad \text{Equation (24)}$$

where $\varepsilon_1$ and $\varepsilon_2$ are small positive or negative numbers (sign chosen so lower bound is less than upper bound).

In one embodiment, hard constraints can be modeled in a form of "transformed points in convex shape". For example, for an affine parameterization of $p_t$, constraints may be as shown below in Equation (25):

$$\begin{pmatrix} 0 \\ 0 \end{pmatrix} \leq \begin{pmatrix} 1 & 0 & c_i^x & c_i^y & 0 & 0 \\ 0 & 1 & 0 & 0 & c_i^x & c_i^y \end{pmatrix} p_t \leq \begin{pmatrix} w \\ h \end{pmatrix} \quad \text{Equation (25)}$$

with w and h being dimensions of the original frame rectangle (e.g., shown in FIG. 6).

Referring back to the method 400 in FIG. 4, at block 408, a crop window transformation B(t) of a pre-defined scale less than one with respect to the original frame size is determined subject to the constraints and minimizations of the residuals. In one example, P(t)=C(t)*B(t), as shown in Equation (6) above, and B(t) is the crop window transform. The crop window transform may be determined by minimizing ($c^T e$), with respect to the parameterization vector $p_t$, where $$e = (e^1, e^2, e^3), e^i = (e_1^i, \ldots, e_n^i)$$

$$c = (w_1, w_2, w_3) \quad \text{Equation (26)}$$

where e is the upper and lower bound as shown in Equation (14) and w are weights. To minimize the L1 norm of the residual, the L1 norm of the slack variable e can be minimized. In vector form, for example, the minimization can be written as the dot product of c·e (or $c^T e$) with c being the vector of all 1. In other examples, c may contain the weights a, b, c from Equation (7) for the corresponding components.

The function ($c^T e$) may be minimized subject to various constraints, such as:

$$\text{Smoothness: } e_t^1 \leq R_t(p) \leq e_t^1$$

$$e_t^2 \leq R_{t+1}(p) - R_t(p) \leq e_t^2$$

$$e_t^3 \leq R_{t+2}(p) - 2R_{t+1}(p) + R_t(p) \leq e_t^3$$

$$e_t^i \geq 0 \quad \text{Equation (27)}$$

$$\text{Proximity: lowerbound} \leq Up_t \leq \text{upperbound} \quad \text{Equation (28)}$$

$$\text{Inclusion: } (0,0)^T \leq CR_t p_t \leq (w,h)^T \quad \text{Equation (29)}$$

In one example, although the objective $c^T e$ is minimized, in a linear program all variables in the constraints may be determined (a linear combination of values according to smoothness, proximity and inclusion may be modeled via slack variables). Therefore, for each frame t, corresponding parameters $p_t$ can be determined, and B(t)=A(x; $p_t$) as in Equation (12).

At block 410, after determining the crop window transformation, B(t), the crop window transformation is applied to the original video to reformat the video or to stabilize the video. For example, the crop window transform may be applied to a crop window of fixed size within domain (or frame size) of the original video. By copying the pixel within the crop window, that is applying the crop, the original video is recast from a viewpoint of the smooth camera path. In other examples, the copying can be supplemented with bi-linear or bi-cubic blending to achieve subpixel accuracy.

When recasting the video, original camera motions may result in equivalent smooth motion of feature points with certain assumptions. For example, for camera translation, if a distance from the camera to objects is much greater than a velocity in any direction, then a static camera results in static feature points, a constant velocity lateral to camera results in constant feature point velocity, a constant velocity in depth approximately results in a constant feature point velocity, and the same approximations can be made for accelerations. As another example, for camera zoom, a constant velocity zoom results in a constant feature point velocity. As still another example, for camera rotation, feature point motion derivatives may diminish as a square of angular velocity.

Figure 7:
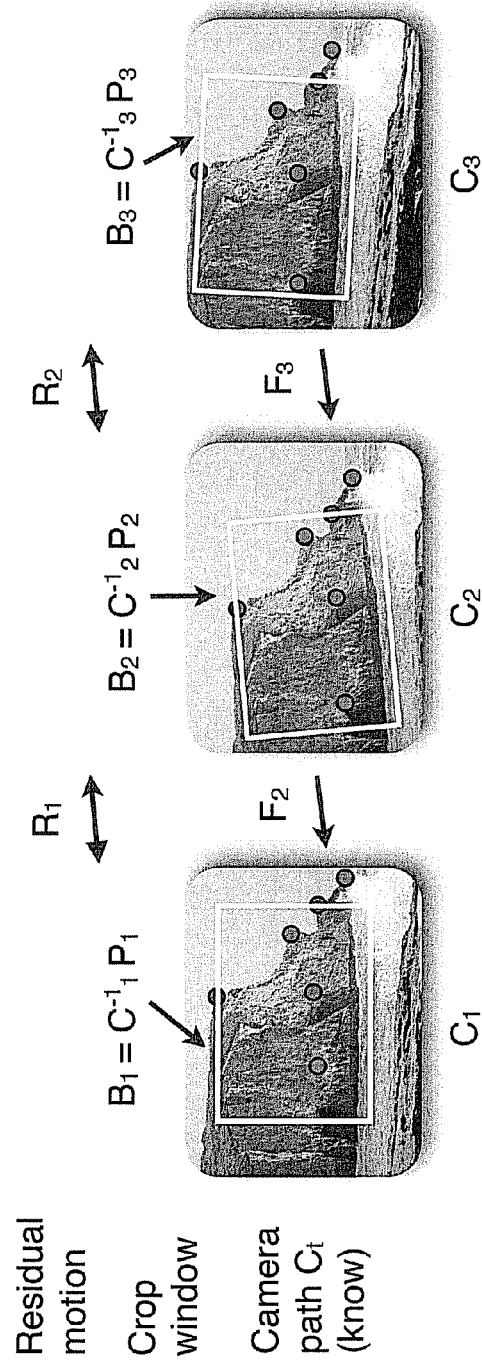
FIG. 7 illustrates example video frames and an example crop window for each video frame.

FIG. 7 illustrates three video frames and an example crop window for each video frame. In this example, a camera path $C_t = C_1, C_2, C_3$ is known describing motion of features between the three video frames in FIG. 7. Features are shown to be dots in each individual video frame. A crop window is described by B(t) and is shown in FIG. 7 as a square box in each of the three video frames. Using the minimization processes described in the method of FIG. 4, a residual motion ($R_1$ and $R_2$) between the video frames can be minimized or removed. If the second video frame is transformed by $B_2$ and the residual $R_1$ is zero, then the video frame along the known feature path $F_2$ equals $B_1$. In this manner, the subsequent video frames include the video content of previous video frames, but the resulting video is more stable.

Figure 8B:
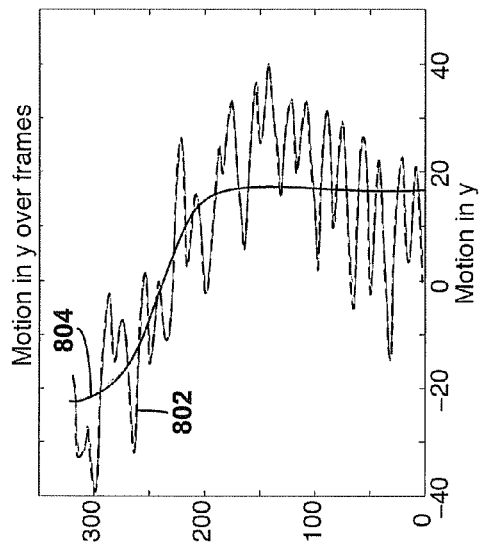
FIGS. 8A-8B illustrate example graphs of an original camera path motion versus an updated or smooth camera path motion.
Figure 8A:
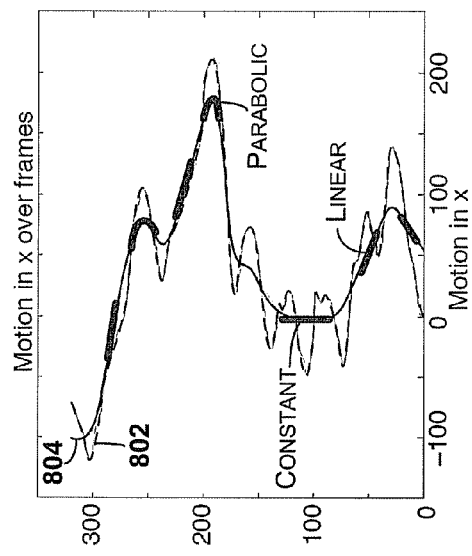

FIGS. 8A-8B illustrate example graphs of an original camera path motion 802 versus an updated or smooth camera path motion 804. For example, FIG. 8A illustrates motion along the x-axis (or horizontal motion). The original camera path motion 802 varies frequency as compared to the optimal L1 path. FIG. 8A also illustrates portions of the optimal L1 path that have a constant path, representing a static camera, i.e., $$\frac{dP}{dt}=0,$$

a linear path of constant velocity, representing a panning or a dolly shot, i.e., $$\frac{d^2P}{dt^2}=0,$$

and a parabolic path of constant acceleration, representing an ease-in and out transition between static and panning cameras, i.e., $$\frac{d^2P}{dt^3}=0.$$

FIG. 8B illustrates motion along the y-axis (or vertical motion). A low-frequency bounce originating from a person walking while recording the video can be replaced by a static camera model, so that motion of the camera can be represented by a straight line, a substantially straight line, or segments of straight lines as function of time on the graph.

As described above using the example methods shown in FIGS. 3-4, a 2D original camera path motion C(t) may be first estimated, and a new path P(t) can be determined. The camera stabilization crop transform B(t) can then be determined that stabilizes C(t) resulting in P(t). In one embodiment, instead of solving for P(t) in two steps by first estimating C(t) and then optimizing for the path P(t), both steps can be performed simultaneously by directly optimizing for the stabilization transform from feature correspondences. In other examples, minimization of residuals may not require C(t), and the per-frame transforms F(t) may be sufficient. Similarly, P(t) may not be computed, but rather B(t) may be obtained. However, in some examples, C(t) and P(t) can be computed via concatenation.

In the example methods shown above in FIGS. 3-4, the estimation of the original camera path motion C(t) can be determined using frame pairs and relying on first order derivatives. The methods are based on N frames, which requires concatenation of camera path derivatives and can lead to error accumulation.

As described above using the example methods shown in FIGS. 3-4, the original camera path motion is approximately an inverse of an average feature path transformation (e.g., as a camera moves to the left, the image pixel content or features move to the right). The average can be computed over robust feature points. As another example, the estimation of the original camera path motion and determination of the new optimal camera path can be performed to simultaneously stabilize all (or several) feature points. For example, using L1 minimization over all features (e.g., for the translation model) results in a "median" of feature tracks as opposed to an average, which can be more robust. A frame stabilization transform, A(t), can be estimated at each frame. A(t) transforms each video frame (and equivalently features in the frame) as opposed to transforming the camera path or crop window as above in the methods of FIGS. 3-4. For example, $$A(t)=\frac{1}{B(t)} \quad \text{Equation (30)}$$

i.e., the frame stabilization transform is the inverse of the crop window transform. A(t) can also be interpreted as a shake in the camera path that causes feature points to move in an opposite direction of the camera. If the shake is instead applied to the feature points, the shake should stabilize the feature points. In an example where A(0)=I (identity: no shake), A(1)=translation of camera by 10 pixels to the right [A(1)*(x,y)=(x+10,y)]. A(1) may cause a feature point to move to the left by 10 pixels, e.g., (0,0) frame 0 moves to (−10,0) in frame 1. Applying A(1) to (−10,0) moves the frame back to (0,0), thereby stabilizing the frame. Stabilized feature points G(t) may be expressed as a function of original features F(t) as shown below:

$$G_{k(t)}=A(t)*F_{k(t)} \text{ [k: feature point index]}$$

$$G_{ki}=A_i*F_{ki} \text{ [i: time index]}$$

Smoothness criteria can be imposed on $G_k$ as follows by minimizing:

$$\sum_t \sum_k \left[ a*\left|\frac{d}{dt}G_{k(t)}\right| + b*\left|\frac{d^2}{dt^2}G_{k(t)}\right| + c*\left|\frac{d^3}{dt^3}G_{k(t)}\right| \right] \quad \text{Equation (31)}$$

which equates to minimizing:

$$\sum_t \sum_k a*|A(t+1)F_k(t+1) - A(t)F_k(t)| + \quad \text{Equation (32)}$$
$$b*|A(t+1)F_k(t+1) - 2A(t)F_k(t) + A(t-1)F_k(t-1)| +$$
$$c*|A(t+2)F_k(t+2) - 3A(t+1)F_k(t+1) +$$
$$3A(t)F_k(t) - A(t-1)F_k(t-1)|$$

Using the Taylor series expansion of A, and applying the Jacobian, this results in: $A(t)F_k(t)=J_k(t)p$, where $$J_k(t) = \frac{d}{dt}pA(t)F_k(t)$$

is the Jacobian of the transformed feature point k with respect to parameters p(t) resulting in:

$$\sum_t \sum_k a*|J_k(t+1)p(t+1) - J_k(t)p(t)| + \quad \text{Equation (33)}$$
$$b*|J_k(t+1)p(t+1) -$$
$$2J_k(t)p(t) + J_k(t-1)p(t-1)| +$$

-continued
$$c * |J_k(t+2)p(t+2) - 3J_k(t+1)p(t+1) + 3J_k(t)p(t) - J_k(t-1)p(t-1)| =$$

$$\sum_{t,k} a \left| \frac{d}{dt} Jp \right| + b * \left| \frac{d^2}{dt^2} Jp \right| + c * \left| \frac{d^3}{dt^3} Jp \right|$$

Note that Equation (33) may be a summation over all feature points as opposed to just the camera path. The constraints required to ensure that the crop window remains within the original frame can be handled in an alternate manner. For example, applying the constraints as before would result in constraint equations as shown in Equation (34):

$$0 < B(t) * w < 1 \rightarrow 0 < \frac{1}{A(t)} * w < 1 \qquad \text{Equation (34)}$$

where w are the crop window corners. This, however, may be expressed in terms of inverse of A, which is non-linear (e.g., quadratic) in the parameters of A. To preserve a linear framework, the rotation and scale components of A may be assumed to be small enough so that upon transforming the frame window corners, the frame window corners would not move by more than a distance to the nearest crop window corner. This assumption provides a stronger constraint on A by forcing the transformed frame window corners to lie in the rectangle formed by the original frame window corner and the nearest crop window corners as its opposite end points. The constraints then can be expressed as follows. Let $(r\_x, r\_y) = A(t) * v$, where v is one of the original frame window corners (e.g., one of $\{(0,0),(0,1),(1,0),(1,1)\}$). Also let the crop window (fixed based on a desired scale of the crop mask) be bounded on left, top, bottom, right by $c_l$, $c_t$, $c_b$, $c_r$, respectively. Then the constraints are:

$$A(0, 0)(x) < c_l \qquad \text{Equation (35)}$$
$$A(0, 0)(y) < c_t$$
$$A(1, 0)(x) > c_r$$
$$A(1, 0)(y) < c_t$$
$$A(0, 1)(x) < c_l$$
$$A(0, 1)(y) > c_b$$
$$A(1, 1)(x) > c_r$$
$$A(1, 1)(y) > c_b$$

where $A(x,y) = A(t)*(x,y)$. An equivalent way of expressing Equation (35) is:

$$Avn^t \leq 0 \qquad \text{Equation (36)}$$

where n is a line representation of each bounding line of the crop-rectangle with a sign such that the inequality corresponds to putting A*v inside the cropping rectangle.

Figure 9B:
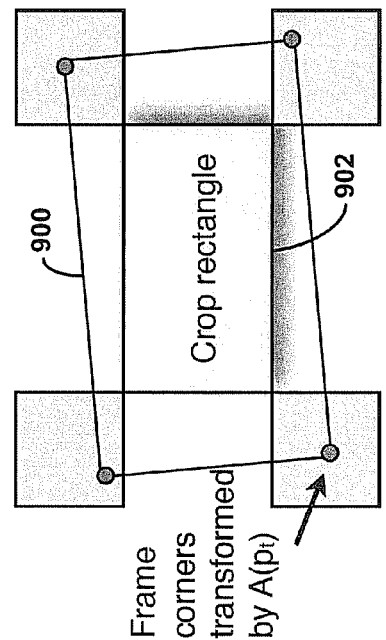
FIGS. 9A-9B illustrate an example original video frame and features points a, b, c, and d.
Figure 9A:
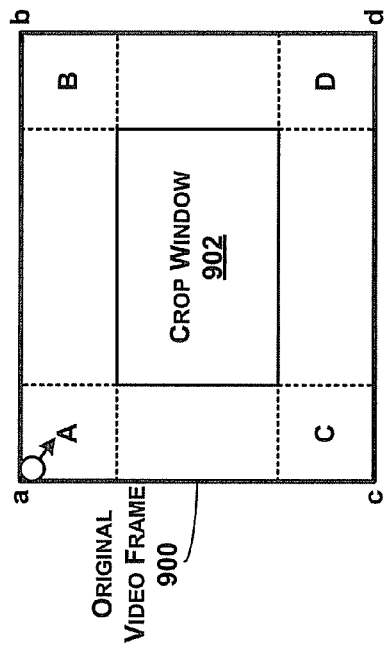

FIGS. 9A-9B illustrate an example original video frame 900 and features points a, b, c, and d. In this example, point a cannot move beyond the box labeled A (cannot cross to right or bottom of bounding dotted lines) using the constraints in Equation (35). In contrast, constraints described above in the method of FIG. 4 allowed motion beyond the dotted line as long as the transformed frame window contained the smaller crop mask 902 (e.g., interior rectangle illustrated in FIGS. 9A-9B. However since rotation and scale are expected to be small, these more restrictive constraints are reasonable.

As still another example, the estimation of the original camera path motion and determination of the new optimal camera path can be performed to stabilize using more than a single transform between frame pairs and less than using all feature points. For example, a small number of transforms between a frame pair can be used, and each of transforms may correspond to different regions in an image that may be moving differently. Each region may correspond to a different transform, and therefore a different M matrix in Equation (13) above. Equation (13) may become:

$$\sum_k |M_k * p_1 - p_2| \qquad \text{Equation (37)}$$

where k refers to the number of region transforms. Note that a number of such transforms may be lower (e.g., 3 to 4) than a number of features (e.g., of the order of hundreds), and therefore more tractable and stable.

Each of the transforms could also be weighted differently depending upon various factors, such as, for example, foreground/background separation (stabilize foreground more than background), a size of regions (stabilize larger regions more than smaller regions), and texturedness (stabilize textured regions over untextured regions). The camera path optimization may then determine a stabilization that minimizes the L1 norm of path smoothness over all transforms. The optimization may lead to selecting a set of transforms to smooth while leaving regions unstable. The choice of which transforms are smoothed may be determined by a combination of individual importance (weights).

III. Content-Aware Video Stabilization and Video Retargeting

Within embodiments, any number of linear constraints may be added for forcing or limiting a modification of the recorded video in some way. For example, constraints can be added to ensure that the crop window remain inside an original video frame. Other types of constraints may be used for content aware constraints, such as maintaining a face (e.g., from a face detector) or other salient (or user-marked) objects/regions within an original video frame. Content-aware constraints may be specified as regions that remain in the cropped frame entirely (e.g., hard constraint) or to some degree (e.g., soft constraint). The constraints may also be specified on a per-frame basis as the estimated smooth camera path may propagate the constraints from key-frames to other frames.

In one example, if a region of interest is represented using a bounding polygon, such as a bounding box, then one constraint for containment may be that each vertex of the polygon lie within the cropping window, e.g., require that specific salient points reside within the crop window. If v is a vertex of the polygon, then in the camera path optimization framework, the constraint is opposite of Equation (36) and may be represented by:

$$A(t)vn^t \geq 0 \qquad \text{Equation (38)}$$

This may be considered a hard constraint and may limit the region of interest to remain inside the cropping window.

As another example, a more relaxed constraint is a soft "one-sided" constraint that penalizes any vertices that move out of the cropping window. As described above, the L1 minimization can be converted to a linear program by adding slack variables, which are minimized, and modified constraints that bound the original constraint within lowerbound≦$Up_t$≦upperbound. A similar procedure may be used to bound the constraints from one side. Specifically, the objective cost function may include:

$$\sum_k w_k * d_k \qquad \text{Equation (39)}$$

where k indexes a combination of polygon vertex v and crop rectangle line n and the constraints:

$$A(t)v_k n_k^t \geq -d_k \qquad \text{Equation (40)}$$

where $d_k \geq 0$.

In one example, to require that specific salient points reside within the crop window, an optimization is performed that is the inverse of stabilization transform $F_t$, i.e., a feature transform $W_t$ (e.g., warp transform) can be applied to a set of features in each frame $I_t$. An inverse of $F_t$ is denoted by $G_t = F_t^{-1}$. Instead of transforming the crop window by $B_t$, a transform $W_t$ of the current features such that motion within a static crop window is composed of static, linear, or parabolic motion is determined. The transform is then given as $B_t = W_t^{-1}$.

Figure 10:
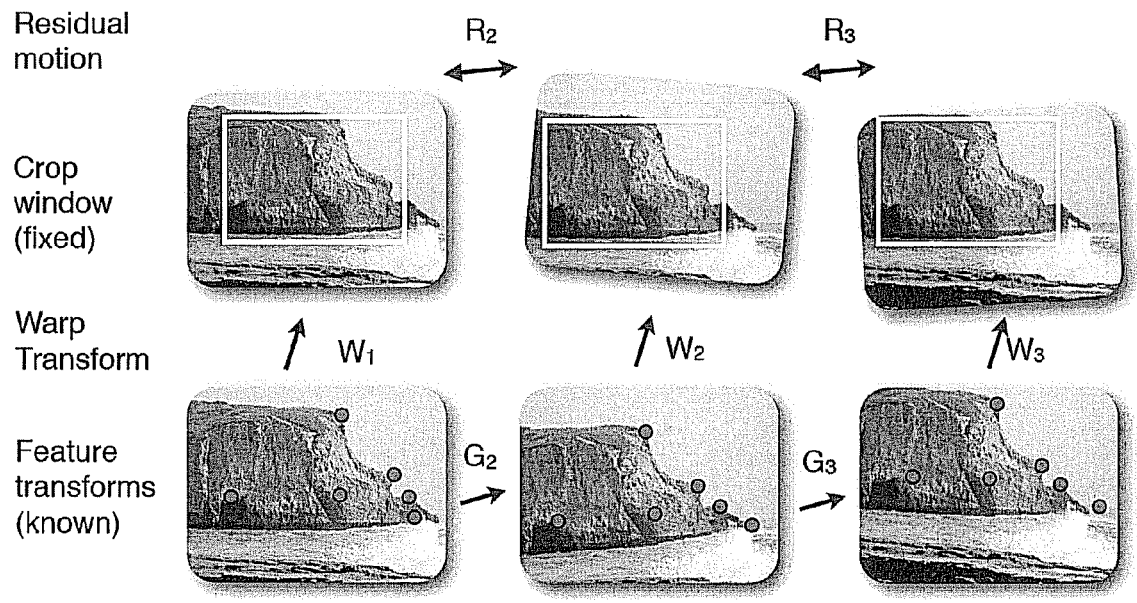
FIG. 10 illustrates example video frames including a fixed crop window to transform the video frames such that salient points reside within the fixed crop window.

FIG. 10 illustrates example video frames including a fixed crop window to transform the video frames such that salient points reside within the fixed crop window. The top three video frames represent original video frames, and a fixed crop window is used to transform the video frames. As shown, the feature transforms are known and feature points are represented by dots on the bottom three video frames. Using the warp transform, the top three video frames can be transformed to the bottom three video frames so that all content within the fixed crop window remains, and the frames are now stabilized in motion.

The corresponding objectives for minimization of the warp transform (similar to Equation (7) above) may be as follows:

$$\text{Minimize } \left|\frac{dW}{dt}\right|: |R_t| = |W_t - W_{t+1}G_{t+1}| \qquad \text{Equation (41)}$$

$$\text{Minimize } \left|\frac{d^2W}{dt^2}\right|: |R_{t+1} - R_t| = \\ |W_{t+3}G_{t+3}G_{t+2} - 2W_{t+1}G_{t+1} + W_t| \qquad \text{Equation (42)}$$

$$\text{Minimize } \left|\frac{d^3W}{dt^3}\right|: |R_{t+2} - 2R_{t+1} - R_t| = \\ |W_{t+4}G_{t+4}G_{t+3}G_{t+2} - 3W_{t+3}G_{t+3}G_{t+2} + 3W_{t+1}G_{t+1} - W_t| \qquad \text{Equation (43)}$$

In one example, saliency constraints may be specified as well using the warp transform. For example, a specific point (e.g., mode in a saliency map) or convex region (e.g., from a face detector) may be constrained to remain within the crop window. A set of salient points in frame $I_t$ may be denoted by $s_i^t$. To estimate the feature transform (e.g., instead of the crop window transform), a one-sided bound (instead of a two-sided bounds for inclusion constraints as in Equation (29)) can be introduced on $s_i^t$ transformed by $A(p_t)$:

$$\begin{pmatrix} 1 & 0 & s_i^x & s_i^y & 0 & 0 \\ 0 & 1 & 0 & & s_i^x & s_i^y \end{pmatrix} p_t - \begin{pmatrix} b_x \\ b_y \end{pmatrix} \geq \begin{pmatrix} -\varepsilon_x \\ -\varepsilon_y \end{pmatrix} \qquad \text{Equation (44)}$$

with $\varepsilon_x, \varepsilon_y \geq 0$. The bounds $(b_x, b_y)$ denote how far from a top-left corner the saliency points will lie, and a similar constraint can be introduced for a bottom-right corner.

Figure 11:
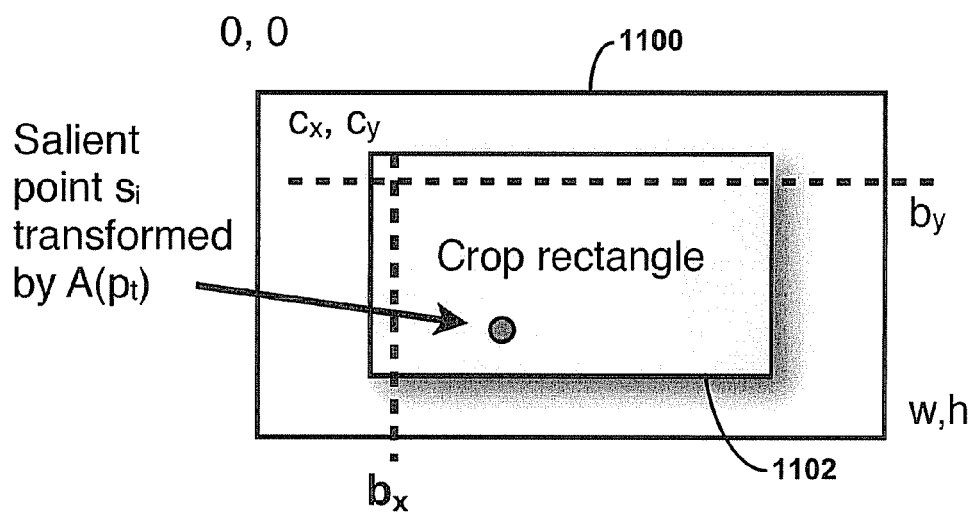
FIG. 11 illustrates an example video frame and a crop window for transformation of the video frame.

FIG. 11 illustrates an example video frame 1100 and a crop window 1102 for transformation of the video frame 1100. The illustration in FIG. 11 includes a canonical coordinate system for transforming the video frame 1100. Choosing $b_x = c_x$ and $c_y = b_y$ will assure that a salient point $s_t$ lies within the crop window. For $b_x > c_x$, the salient point can be moved to a region of the crop window 1102, e.g., to a center. By choosing $\varepsilon_x, \varepsilon_y = 0$, this constraint is a hard constraint, however, the constraint may collide with the inclusion constraint of the frame rectangle and could sacrifice path smoothness. Thus, $\varepsilon_x$ and $\varepsilon_y$ may be treated as new slack variables, which can be added to the objective (e.g., $c^T e$) of the linear programming minimization, for example. An associated weight may control a trade off between a smooth path and a retargeting constraint, and an example weight of 10 may be used.

Inclusion constraint can be used and adjusted from those described above, as the crop window points can be transformed by the inverse of the optimized feature transform. In one example, transformed frame corners may be required to lie within a rectangular area around a crop rectangle, as illustrated in FIGS. 9A-9B above, for example. An estimation of the optimal feature paths can be achieved from feature points $f_k^t$ in frame $I_t$, i.e., without a need to compute $G_t$, for example. In this setting, instead of minimizing the L1 norm of the parameterized residual $R(p_t)$, the L1 norm of the feature distance can be minimized. Thus, $R_t$ becomes;

$$|R_t| = \sum_{f_k:\, featurematches} |W(p_t)f_k^t - W(p_{t+1})f_k^{t+1}|_1 \qquad \text{Equation (45)}$$

As $G_t$ is computed such that $G_{t+1}f_k^t = f_k^{t+1}$, the optimization of the feature warp $W_t$ may average an error over all features.

IV. Residual Motion (Wobble and Rolling Shutter) Removal

To model inter-frame motion for shake-removal, motion models with a higher number of DOFs than similarities may be needed. In one embodiment, a hybrid approach can be used with similarities $S_t$ to construct an optimal camera path. The optimal camera path can be determined for every k=30 key frames of a recorded video using higher dimensional homographies $H_t$ to account for mis-alignments.

Figure 12:
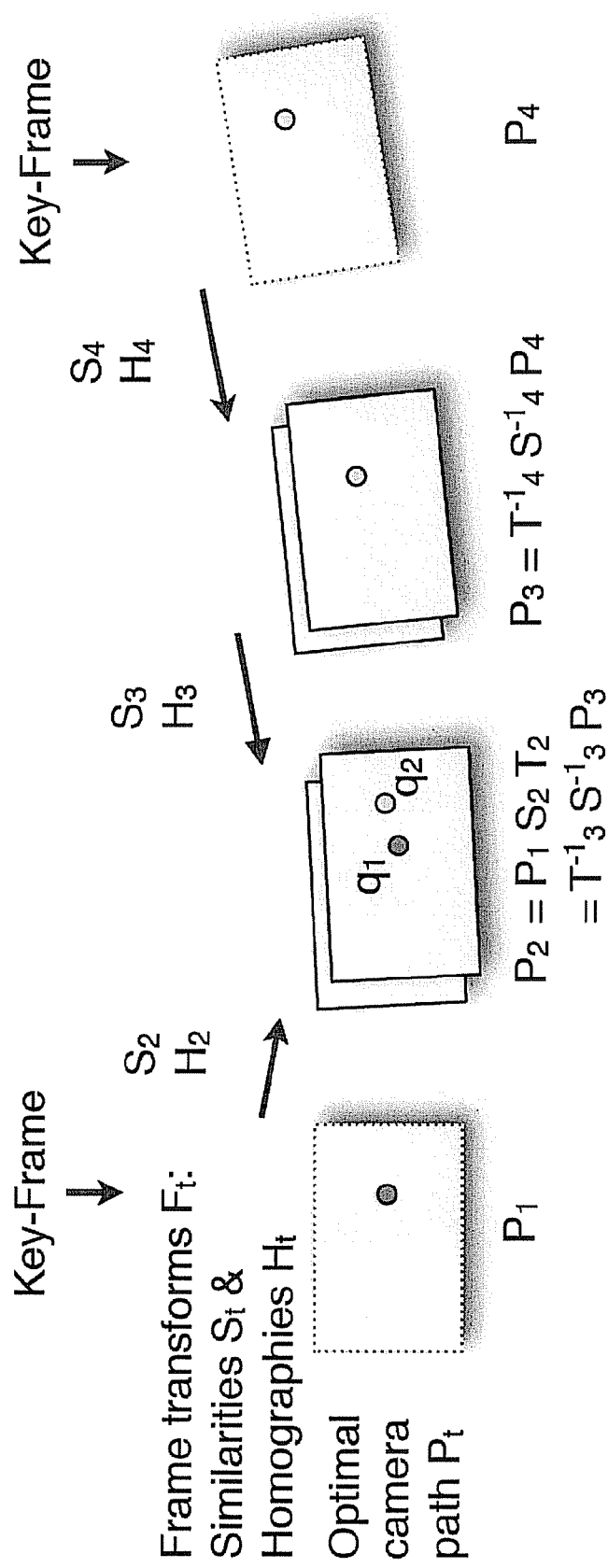
FIG. 12 illustrates example video frames of a video, and performing wobble suppression of the video frames.

FIG. 12 illustrates example video frames of a video, and performing wobble suppression of the video frames. A difference of two optimal adjacent camera transforms $P_1^{-1}P_2$ can be decomposed into known estimated similarity portions $S_2$ (lower-parametric frame transform $S_t$ used as input) and a smooth residual $R_2$ (representing a smooth shift added by optimization to satisfy the constraints). A low-dimensional similarity $S_2$ can be replaced with a higher dimensional homography $H_2$. For each intermediate frame, this replacement can be applied with respect to a previous key frame. This results in two sample locations $q_1$ and $q_2$ per pixel as shown in FIG. 12 (e.g., with an average error of about 2-5 pixels, making it possible to use linear blending between the two locations). In one example, for consistency, the warp can be computed forward from the previous and backward from next key-frame, blending the locations $q_1$ and $q_2$ linearly.

For an example camera path in FIG. 12, $C_2 = C_1 * F_2$. In FIG. 12, $F_2$ is referred to as $S_2$ to indicate that the transformation is similarity (e.g., $C_2 = C_1 * S_2$). To determine the relationship between optimal path transforms $P_2$ and $P_1$, in one example, if the video could be stabilized perfectly $P_2=P_1*S_2$, which may indicate that the residual in the L1 minimization is zero. In general, however, this may not occur, and thus, the transform from $P_1$ to $P_2$ can be referred to as a similarity and a residual motion $T_2$, such that $P_2=P_1*S_2*T_2$. Thus, the motion $T_2=S_2^{-1}P_1^{-1}P_2$.

In one example, the $T_2$ may be considered a smooth additional motion layered on top of the stabilization transform $S_2$ to account for various constraints introduced. The path transform $P_2$ can be re-computed by substituting $S_2$ with a higher parametric motion model $H_2$ (e.g., homography) in the equation for $P_2$ resulting in $P'_2=P_1*H_2*T_2$. This may result in a more stabilized result (e.g., more degrees of freedom can adapt to rolling shutter, etc.), and may also lead to drift (e.g., instabilities due to concatenation in skew, perspective, etc.). To remove or compensate for drift, the computed $P_t$ (e.g., free of drift as based on similarities) may be used at key frames (e.g., every $30^{th}$ frame), and the substitution of $H_2$ may be used in between. In one example, the substitution may be employed from the previous and next key frame to determine $P'_n$ and $P''_n$. A new wobble reduced camera path can then obtained as a weighted average of a' $P'_n$+a'' $P''_n$. A linear weight may be used based on a distance to the key frames, e.g., a' is 1 and a''=0 at the previous key frame and a'=0 and a''=1 at the next frame, linear in between.

V. Video Retargeting

Content-aware constraints may also be used for retargeting in addition to or rather than stabilization. Retargeting refers modifying a recorded video to fit a device with a different resolution aspect-ratio than the recorded video. Using methods described herein, a cropping window can be matched to an aspect ratio of a target device, for example. Further, content aware constraints can be used to ensure that salient content stays within the crop window. Optionally, stabilization of feature points can be performed as well.

In one embodiment, to perform retargeting, instead of estimating a forward feature transform F between every pair of frames and using the resulting M matrices (e.g., as for performing stabilization), a number of matrices M=I (identity), which corresponds to minimizing $$|p_2-p_1| \quad \text{Equation (46)}$$

instead of minimizing Equation (13) (including higher order terms) as for performing stabilization, for example.

Video Retargeting may change the aspect ratio of a video while preserving salient, i.e., visually prominent regions.

A crop window may have a fixed predetermined size. For example, a scale may be predetermined by first performing a video stabilization and then expanding the crop window to a maximum possible size that fits within the transformed frame windows over all frames, i.e., determine $A(t)*v$, where v are the frame window corners for all frames t. A largest rectangle (represented by lines m) can be determined, such that:

$$m^t A(t) v \geq 0 \quad \text{Equation (47)}$$

Note that since m may be axis aligned, computing this rectangle can be accomplished by identifying minimum and maximum values of the frame window coordinates over all times.

In one embodiment, constraints may be added to the one-sided constraints above such that the frame transforms, A(t), result in as large a frame window as possible. A corresponding objective and constraint may be of the form:

$$\text{Min} \sum_k w_k d_k \quad \text{Equation (48)}$$

such that $A(t)vr^t \geq d_k$, $d_k \geq 0$, k varies over a combination of the four frame window corners and frame window rectangle lines, $d_k$ are slack variables representing how far each corner moves away from the original frame rectangle, and $w_k$ are weights.

VI. Example Systems and Computer Program Products

Figure 13:
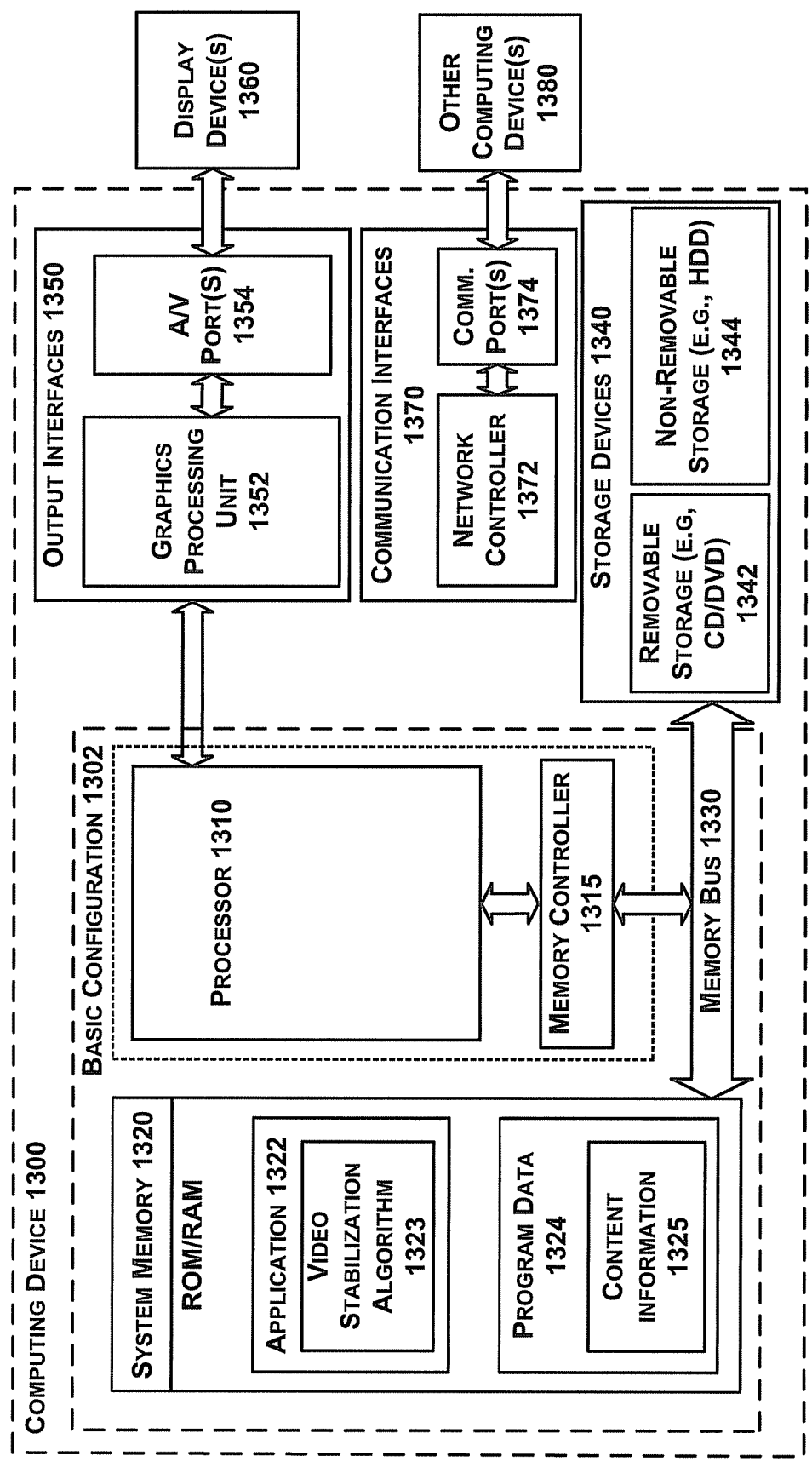
FIG. 13 is a functional block diagram illustrating an example computing device used in a computing system that is arranged in accordance with at least some embodiments described herein.

FIG. 13 is a functional block diagram illustrating an example computing device 1300 used in a computing system that is arranged in accordance with at least some embodiments described herein. The computing device may be a personal computer, mobile device, cellular phone, video game system, or global positioning system, and may be implemented as a client device, a server, a system, a combination thereof, or as a portion of components described in FIGS. 1-2. In a basic configuration 1302, computing device 1300 may include one or more processors 1310 and system memory 1320. A memory bus 1330 can be used for communicating between the processor 1310 and the system memory 1320. Depending on the desired configuration, processor 1310 can be of any type including but not limited to a microprocessor (µP), a microcontroller (µC), a digital signal processor (DSP), or any combination thereof. A memory controller 1315 can also be used with the processor 1310, or in some implementations, the memory controller 1315 can be an internal part of the processor 1310.

Depending on the desired configuration, the system memory 1320 can be of any type including but not limited to volatile memory (such as RAM), non-volatile memory (such as ROM, flash memory, etc.) or any combination thereof. System memory 1320 may include one or more applications 1322, and program data 1324. Application 1322 may include an video stabilization algorithm 1323 that is arranged to provide inputs to the electronic circuits, in accordance with the present disclosure. Program Data 1324 may include video content information 1325 that could be directed to any number of types of data. In some example embodiments, application 1322 can be arranged to operate with program data 1324 on an operating system.

Computing device 1300 can have additional features or functionality, and additional interfaces to facilitate communications between the basic configuration 1302 and any devices and interfaces. For example, data storage devices 1340 can be provided including removable storage devices 1342, non-removable storage devices 1344, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 1320 and storage devices 1340 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media can be part of device 1300.

Computing device 1300 can also include output interfaces 1350 that may include a graphics processing unit 1352, which can be configured to communicate to various external devices such as display devices 1360 or speakers via one or more A/V ports 1354 or a communication interface 1370. The communication interface 1370 may include a network controller 1372, which can be arranged to facilitate communications with one or more other computing devices 1380 over a network communication via one or more communication ports 1374. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 1300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

In some embodiments, the disclosed methods may be implemented as computer program instructions encoded on a computer-readable storage media in a machine-readable format, or on other non-transitory media or articles of manufacture. FIG. 14 is a schematic illustrating a conceptual partial view of an example computer program product 1400 that includes a computer program for executing a computer process on a computing device, arranged according to at least some embodiments presented herein. In one embodiment, the example computer program product 1400 is provided using a signal bearing medium 1401. The signal bearing medium 1401 may include one or more program instructions 1402 that, when executed by one or more processors may provide functionality or portions of the functionality described above with respect to FIGS. 1-13. Thus, for example, referring to the embodiments shown in FIGS. 3 and 4, one or more features of blocks 302-310 and/or blocks 402-410 may be undertaken by one or more instructions associated with the signal bearing medium 1401. In addition, the program instructions 1402 in FIG. 14 describe example instructions as well.

In some examples, the signal bearing medium 1401 may encompass a computer-readable medium 1403, such as, but not limited to, a hard disk drive, a Compact Disc (CD), a Digital Video Disk (DVD), a digital tape, memory, etc. In some implementations, the signal bearing medium 1401 may encompass a computer recordable medium 1404, such as, but not limited to, memory, read/write (R/W) CDs, R/W DVDs, etc. In some implementations, the signal bearing medium 1401 may encompass a communications medium 1405, such as, but not limited to, a digital and/or an analog communication medium (e.g., a fiber optic cable, a waveguide, a wired communications link, a wireless communication link, etc.). Thus, for example, the signal bearing medium 1401 may be conveyed by a wireless form of the communications medium 1405 (e.g., a wireless communications medium conforming with the IEEE 802.11 standard or other transmission protocol).

The one or more programming instructions 1402 may be, for example, computer executable and/or logic implemented instructions. In some examples, a computing device such as the computing device 1300 of FIG. 13 may be configured to provide various operations, functions, or actions in response to the programming instructions 1402 conveyed to the computing device 1300 by one or more of the computer readable medium 1403, the computer recordable medium 1404, and/or the communications medium 1405.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method for processing a video, comprising: estimating an original motion path of a camera that recorded the video;
   determining a first derivative, a second derivative, and a third derivative of the original motion path of the camera with respect to time;
   determining a modified motion camera path of the original motion path of the camera based on a weighted combination of the first derivative, the second derivative, and the third derivative of the original motion path of the camera;
   based on the modified motion camera path and the original motion path of the camera, determining a crop window transform that describes how to modify the original motion path of the camera to the modified motion camera path, the crop window transform determined according to at least one constraint limiting changes to the original motion path of the camera; and
   applying the crop window transform to the video to recast the video from a viewpoint of the original motion path of the camera to a viewpoint of the modified motion camera path.

2. The method of claim 1, wherein determining the crop window transform comprises determining a crop window of a pre-defined scale less than one with respect to a video frame of the video, wherein the crop window is defined to fit inside the original frame.

3. The method of claim 2, wherein determining the modified motion camera path comprises minimizing $a|dP/dt| + b|d^2P/dt^2| + c|d^3P/dt^3|$, where P is the original motion camera path and a, b and c are linear weights such that the crop window is contained within the video frame of the video for all time t.

4. The method of claim 3, wherein minimizing $$a\left|\frac{dP}{dt}\right| + b\left|\frac{d^2P}{dt^2}\right| + c\left|\frac{d^3P}{dt^3}\right|$$

comprises performing an L1 minimization.

5. The method of claim 3, wherein the linear weight c is chosen to be an order of magnitude larger than a maximum of the linear weights a and b.

6. The method of claim 1, wherein estimating the original motion path of the camera comprises:
   extracting features of frames of the video;
   matching given features between the frames of the video;
   performing local outlier rejection to remove spurious matches;
   determining linear motion models to estimate motion of the matched features between the frames of the video; and
   concatenating the linear motion models to yield an estimate of the original motion path of the camera.

7. The method of claim 1, wherein applying the crop window transform to recast the video from the viewpoint of the original motion path to the viewpoint of the modified motion camera path comprises for video frames of the video, cropping out content.

8. The method of claim 7, wherein the at least one constraint includes an inclusion constraint that requires a portion of a video frame of the transformed video to be contained in a video frame of the video from the original motion path.

9. The method of claim 7, wherein the at least one constraint includes a proximity constraint that requires the modified motion camera path to substantially preserve zooming within the video.

10. The method of claim 7, wherein the at least one constraint includes a saliency constraint that requires selected points of video frames of the video to remain in video frames of the modified motion camera path.

11. The method of claim 7, wherein the at least one constraint includes limiting points in a video frame of the video from moving beyond a preset area within video frames of the modified motion camera path.

12. The method of claim 7, wherein the at least one constraint includes requiring points in a video frame of the video to be within a crop window.

13. The method of claim 12, wherein the at least one constraint includes requiring the crop window to remain inside the video frame of the video.

14. The method of claim 12, wherein the at least one constraint includes requiring each vertex of a polygon surrounding a region of interest to lie within the crop window.

15. The method of claim 7, wherein the at least one constraint is specified on a per-frame basis.

16. The method of claim 1, wherein the crop window transform is B(t), where B(t)=C(t)$^{-1}$P(t), and C(t) is the original motion path and P(t) is the modified motion camera path.

17. The method of claim 1, wherein applying the crop window transform to the video to recast the video from a viewpoint of the original motion path to a viewpoint of the modified motion camera path comprises stabilizing the video.

18. The method of claim 1, wherein applying the crop window transform to the video to recast the video from a viewpoint of the original motion path to a viewpoint of the modified motion camera path comprises retargeting the video to fit a device with a different resolution aspect-ratio than the video.

19. A non-transitory computer readable medium having stored therein instructions executable by a computing device to cause the computing device to perform functions of:
   estimating an original motion path of a camera that recorded a video;
   determining a first derivative, a second derivative, and a third derivative of the original motion path of the camera with respect to time;
   determining a modified motion camera path of the original motion path of the camera based on a weighted combination of the first derivative, the second derivative, and the third derivative of the original motion path of the camera;
   based on the modified motion camera path and the original motion path of the camera, determining a crop window transform that describes how to modify the original motion path of the camera to the modified motion camera path, the crop window transform determined according to at least one constraint limiting changes to the original motion path of the camera; and
   applying the crop window transform to the video to recast the video from a viewpoint of the original motion path of the camera to a viewpoint of the modified motion camera path.

20. The non-transitory computer readable medium of claim 19, wherein the function of applying the crop window transform to the video to recast the video from a viewpoint of the original motion path to a viewpoint of the modified motion camera path comprises stabilizing the video.

21. The non-transitory computer readable medium of claim 19, wherein the function of applying the crop window transform to the video to recast the video from a viewpoint of the original motion path to a viewpoint of the modified motion camera path comprises retargeting the video to fit a device with a different resolution aspect-ratio than the video.

22. The non-transitory computer readable medium of claim 19, wherein the function of applying the crop window transform to the video to recast the video from the viewpoint of the original motion path to the viewpoint of the modified motion camera path comprises for video frames of the video, cropping out content, and wherein the at least one constraint includes an inclusion constraint that requires a portion of a video frame of the transformed video to be contained in a video frame of the video from the original motion path.

23. A camera path translation system comprising:
   a camera path estimation engine configured to receive a video, and to estimate an original motion path of a camera that recorded the video based on motion of objects within the video;
   a video stabilization and retargeting engine configured to determine a crop window transform that describes how to modify the original motion path of the camera to a modified motion camera path, the crop window transform determined according to at least one constraint limiting changes to the original motion path of the camera, wherein the video stabilization and retargeting engine is configured to determine a first derivative, a second derivative, and a third derivative of the original motion path of the camera with respect to time, and to determine the modified motion camera path of the original motion path of the camera based on a weighted combination of the first derivative, the second derivative, and the third derivative of the original motion path of the camera; and
   a video translation engine configured to apply the crop window transform to the video to recast the video from a viewpoint of the original motion path of the camera to a viewpoint of the modified motion camera path.

24. The camera path translation system of claim 23, further comprising a video hosting server that comprises the camera path estimation engine, the video stabilization and retargeting engine and the video translation engine.

25. The camera path translation system of claim 24, wherein the video hosting server is configured to receive the video, to recast the video from the viewpoint of the original motion path of the camera to the viewpoint of the modified motion camera path so as to stabilize the video, and to upload the stabilized video to a video hosting website.

* * * * *